United States Patent
Ibert et al.

(10) Patent No.: US 7,627,853 B2
(45) Date of Patent: Dec. 1, 2009

(54) GENERIC CONNECTOR BETWEEN A MIDDLEWARE LAYER AND A SERVER SOFTWARE OBJECT

(75) Inventors: Terence Winfield Ibert, Antibes (FR); Henrique Miguel da Silva Morais, Nice (FR)

(73) Assignee: Accenture Global Services GmbH, Schaffhausen (CH)

( * ) Notice: Subject to any disclaimer, the term of this patent is extended or adjusted under 35 U.S.C. 154(b) by 907 days.

(21) Appl. No.: 10/278,171

(22) Filed: Oct. 21, 2002

(65) Prior Publication Data

US 2003/0195997 A1 Oct. 16, 2003

Related U.S. Application Data

(60) Provisional application No. 60/343,614, filed on Oct. 29, 2001.

(51) Int. Cl.
G06F 9/44 (2006.01)
G06F 3/00 (2006.01)

(52) U.S. Cl. .................. 717/108; 717/107; 717/106; 717/104; 719/328; 719/329

(58) Field of Classification Search .................. 717/108, 717/107, 106, 104; 719/328, 329
See application file for complete search history.

(56) References Cited

U.S. PATENT DOCUMENTS

| | | | | |
|---|---|---|---|---|
| 5,870,605 | A | * | 2/1999 | Bracho et al. ............... 719/318 |
| 5,873,084 | A | | 2/1999 | Bracho et al. |
| 5,889,995 | A | * | 3/1999 | Segnan ........................ 717/141 |
| 5,913,065 | A | | 6/1999 | Faustini |
| 5,915,253 | A | * | 6/1999 | Christiansen ........... 707/103 R |
| 6,044,218 | A | | 3/2000 | Faustini |
| 6,088,796 | A | | 7/2000 | Cianfrocca et al. |
| 6,094,688 | A | * | 7/2000 | Mellen-Garnett et al. ... 719/328 |
| 6,163,776 | A | | 12/2000 | Periwal |
| 6,199,195 | B1 | * | 3/2001 | Goodwin et al. ............ 717/104 |
| 6,216,158 | B1 | | 4/2001 | Luo et al. |
| 6,298,478 | B1 | * | 10/2001 | Nally et al. .................. 717/170 |
| 6,351,776 | B1 | | 2/2002 | O'Brien et al. |
| 6,832,238 | B1 | * | 12/2004 | Sharma et al. .............. 709/201 |
| 7,096,252 | B1 | * | 8/2006 | Hvostov et al. ............. 719/330 |

OTHER PUBLICATIONS

Anido-Rifon, et al. "A Component Model for Standardized Web-Based Education", 2001, ACM, p. 1-21.*
Dashofy E.M., et al., "Using Off-the-Shelf Middleware to Implement Connectors in Distributed Software Architectures", Proceedings of the 1999 International Conference on Software Engineering. (ICSE 99), Los Angeles, CA, May 16-22, 1999, International Conference on Software Engineering, Los Almitos, CA: IEEE Comp. Soc. Press, US, May 16, 1999, pp. 3-12.
Poole, John D., "Model-Driven Architecture: Vision, Standards and Emerging Technologies" ECOOP. European Conference on Object-Oriented Programming, Apr. 2001, pp. 1-15.
European Supplementary Search Report for EP 02773831.9 dated Nov. 10, 2005, p. 1-2.

* cited by examiner

*Primary Examiner*—Qamrun Nahar
(74) *Attorney, Agent, or Firm*—Banner & Witcoff, Ltd.

(57) ABSTRACT

A method is described for constructing a generalized connector for use in an object-oriented program system, the connector being a middleware service logic mechanism between an event monitor and transmission sub-system and an application system having an application system Application Program Interface (API), wherein the connector can recognize events provided by the event monitor as event objects and can automatically determine which corresponding ENTERPRISE JAVA BEAN (EJB) software object is associated with the event object, and can invoke methods on the EJB software object in a specified order, and can collect the results of the method invocations for return to the event monitor. A connector for performing these functions is also described.

16 Claims, 12 Drawing Sheets

Flow Properties

Show: | Amdocs |

| Property | Value |
|---|---|
| Accept values that are null from Bean | True |
| Allow only events that belong to module | False |
| Allow to specify optional complex | False |
| Commit after | amdocsBeans |
| JNDI Binding Name Prefix | 5 – Log ful detail of occurrences |
| Log Level | True |
| No Dates Pass Null To Bean | False |
| Participates in transactions | ************ |
| Password | spec |
| Prefix for names of Plug-in Events | True |
| Rollback events being processed during machine failure on startup | False |
| Send bean application errors to connector error model | True |
| Send data mapping errors to connector error model | null |
| String Value If Null | 13://localhost:7100 |
| URL | system |
| User | |

Enter the username used for logging into the weblogic environment.

FIG. 6

GENERIC CONNECTOR BETWEEN A MIDDLEWARE LAYER AND A SERVER SOFTWARE OBJECT

RELATED INVENTIONS

This application claims priority from provisional United States patent application titled "A GENERIC CONNECTOR BETWEEN VITRIA AND AN EJB COMPLIANT API FOR AN APPLICATION," Ser. No. 60/343,614 filed on Oct. 29, 2001.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to the field of computer systems. More particularly, the present invention relates to a method and system for using presentations of middleware data structures to represent how to interact with ENTERPRISE JAVA BEAN software objects to permit dynamic bridging of a middleware application to an EJB software object API without knowledge of the underlying functionality.

BACKGROUND ART

A technical problem presently exists in the attempt to prepare a connector between systems such as Vitria Business Ware to an ENTERPRISE JAVA BEAN (EJB) software object Application Program Interface (API) for an interfacing application, in that the underlying functionality of the application must be known and explicit code must be written to control an interaction/session with the JAVA BEAN software object. This is excessively detail oriented and time consuming and therefore subject to error.

In the past, attempts have been made to solve similar problems to permit creation of live applications or applets by using graphical representations of program modules. One such attempt is taught in U.S. Pat. No. 6,044,218 issued Mar. 28, 2000 titled "System, method and article of manufacture for creating a live application or applet development environment." This patent teaches software that cooperatively promotes and permits immediate socialization of new components with existing components as the new components are instantiated or dropped onto the development desktop. This is achieved by registering a new component being instantiated with the development environment's kernel. Registration, in turn, invokes an initialization method derived from the class template that yielded the new component. The initialization method appropriately personalizes the new component when it executes its associated logic. The initialization method provides an editor for the new component if its properties are to be made editable. The software environment, its kernel, templates, components, editor and methods are preferably programmed in the JAVA programming language or a JAVA compatible language.

Another earlier system is taught in U.S. Pat. No. 5,913,065, issued Jun. 15, 1999, titled "System, method and article of manufacture for creating hierarchical folder components for use in a JAVA programming language application or applet." This patent teaches a system and method for creating hierarchical folder components for use with other object oriented based components, including other folder components, and component assemblies. Each hierarchical folder is provided with an editor that pops up upon its instantiation and permits a user to edit the folder component name as well as the number and type of ports assigned to the folder component.

Both of these patents teach systems to use representations of program modules or objects to graphically create an application by automatically connecting these modules or objects to form an executable object oriented program. Neither of these systems or methods describe a way of allowing the message definition of a middleware module to dictate the business logic of interacting with an EJB software object to fulfill the programmed requirements/events without knowledge of the underlying application functionality.

These is a need in the art for a system and method for a more cost efficient and less error prone system of creating a connector in an object-oriented system by using representations of middleware data structures to represent how to interact with an ENTERPRISE JAVA BEAN software object to permit dynamic bridging of a middleware application to an EJB software object API without knowledge of the underlying application functionality.

SUMMARY OF THE INVENTION

The present invention provides a solution to the needs described above through a system and method for creating a connector in an object-oriented system by using representations of middleware data structures to represent how to interact with an ENTERPRISE JAVA BEAN software object to permit dynamic bridging of a middleware application to an EJB software object API without knowledge of the underlying application functionality.

A method is described for constructing a generalized connector for use in an object-oriented program system, the connector being a middleware service logic mechanism between an event monitor and transmission sub-system and an application system having an application system API, wherein the connector can recognize events provided by the event monitor as event objects and can automatically determine which corresponding EJB software object is associated with the event object, and can invoke methods on the EJB software object in a specified order, and can collect the results of the method invocations for return to the event monitor. A connector for performing these functions is also described.

A connector is disclosed which provides for dynamic bridging of a middleware application to an EJB software object API, without knowledge of the underlying procedural functionality of the new application, and includes logic mechanisms for determining the interfacing signature of an EJB software object, determining the new data structures, and logic mechanisms for matching the interfacing signature with the data structures using the JAVA programming language Reflection capability.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

BRIEF DESCRIPTION OF THE SEVERAL VIEWS OF THE DRAWINGS

FIG. 6 depicts a screen shot of an Amdocs Flow Properties screen.

DETAILED DESCRIPTION OF THE INVENTION

The present invention provides a solution to the needs described above through a system and method for using representations of middleware data structures to represent how to interact with an ENTERPRISE JAVA BEAN software object to permit dynamic bridging of a middleware application to an EJB software object API without knowledge of the underlying application functionality.

The invention and its best mode are described in the following detailed embodiment descriptions.

DESCRIPTION OF AN EXEMPLARY EMBODIMENT

An exemplary embodiment of the invention is described by means of a description of the installation and use of the Amdocs-Vitria Connector flow and an exemplary description of how to support Vitria connector models that use this flow.

In the following description of the exemplary embodiment, reference is made to a number of external documents, which are known to those skilled-in-the-art, including specifically the following references which are hereby specifically incorporated herein by reference:

External Document References

| Document | Date | Version |
|---|---|---|
| API Link Technical Specification | | |
| Amdocs API Link Authorization and Authentication | | |
| Java 2 Standard Edition v1.2.2 Documentation | | |
| BusinessWare 3.1.2 Foundations | | |
| BusinessWare 3.1.2 Connector Programming Guide | | |
| BusinessWare 3.1.2 Connector Architecture Guide | | |
| BusinessWare 3.1.2 Programming Guide | | |
| BusinessWare 3.1.2 Connector Samples | | |

Also in the following description of the exemplary embodiment, reference is made to various acronyms which are defined as follows:

Terminology

| Acronym | Description |
|---|---|
| API | Application Programming Interface |
| COM | Common Object Model ™ |
| CORBA | Common Object Request Broker Architecture ™ |
| EAI | Enterprise Application Integration |
| EJB | ENTERPRISE JAVA BEANS ™ |
| EMT | Error, Messaging, and Trace framework (Vitria) |
| RMI | Remote Method Invocation |
| IDL | Interface Definition Language |
| J2EE | JAVA 2 Platform Enterprise Edition ™ |
| CSM | Customer Service Management |
| JDNI | JAVA Naming and Directory Interface ™ |
| JDBC ™ | JAVA API for executing SQL statements. |

Figure 1:
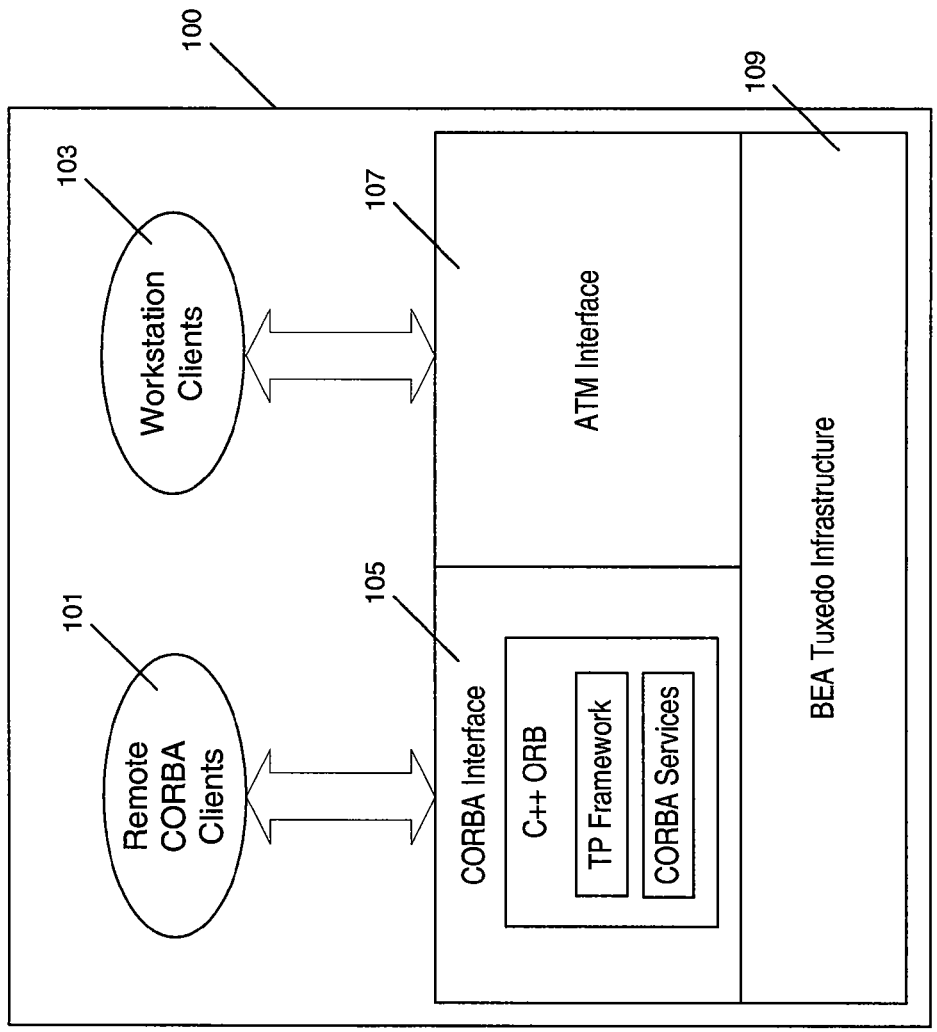
FIG. 1 illustrates a typical Prior Art depiction of a BEA™ Tuxedo system architecture.

Referring now to FIG. 1, a typical BEA™ Tuxedo product architecture 100 is displayed. In FIG. 1, a CORBA interface is shown allowing Remote CORBA clients 101 to connect to the CORBA interface system 105 for passing transaction event objects to the BEA tuxedo infrastructure 109. Also shown is an application to transaction monitor interface (ATMI) 107, whereby workstation clients 103 can pass event transaction objects to the BEA Tuxedo infrastructure 109.

Figure 2:
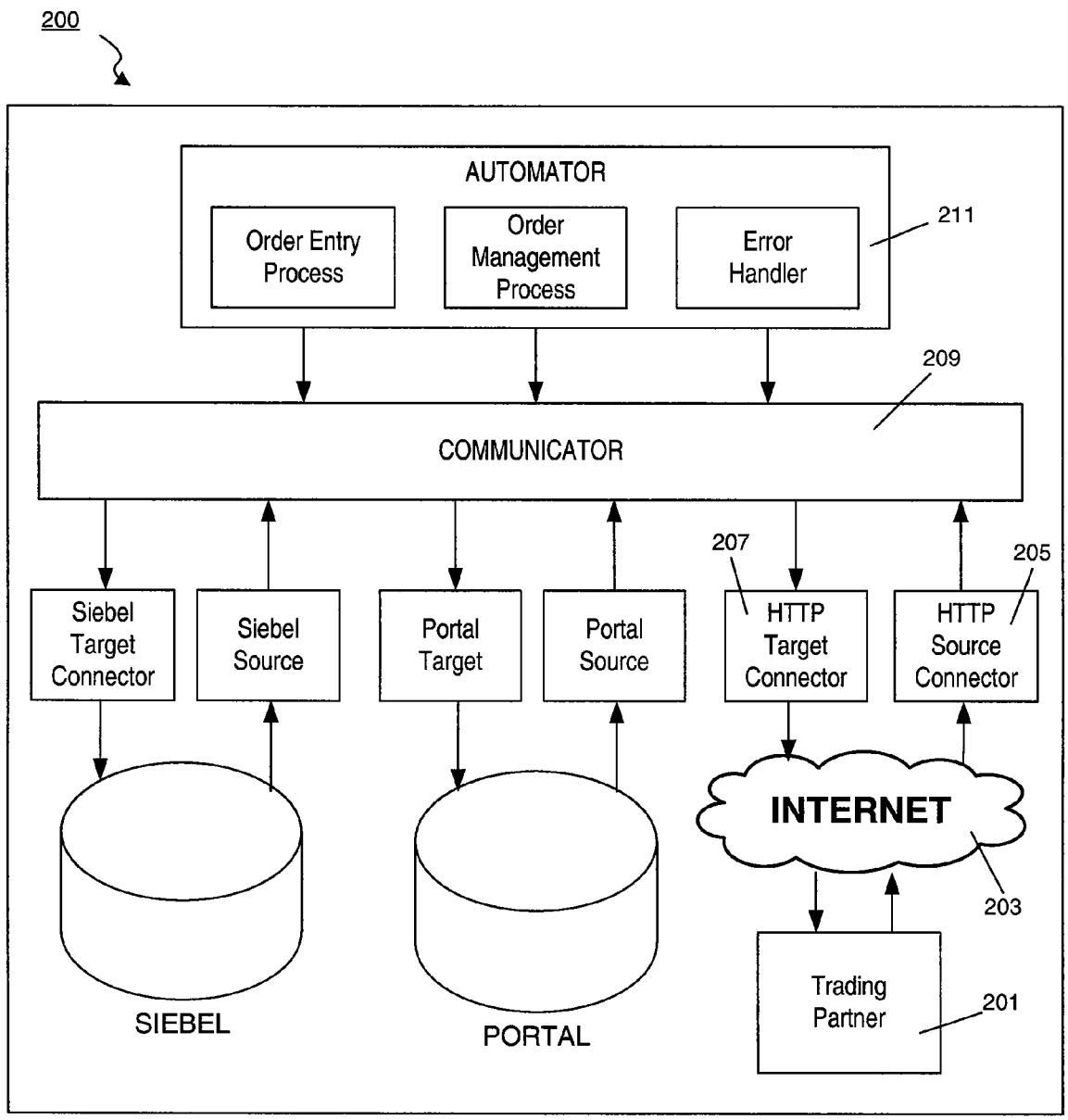
FIG. 2 illustrates a general Vitriam system architecture that shows the use of connectors.

The present invention will be described with reference to an exemplary system using a VITRIA™ based system. In FIG. 2 a typical Vitria system architecture 200 is shown. In FIG. 2 a client/trading partner 201 receives and passes event objects through the Internet 203, generally passing an event notice to an application 211, via the communicator 209, by means of a Source Connector 205. Similarly the client 201 will receive the results of the event or perhaps an error notice, from the application 211, via the communicator 209, by means of a Target Connector 207 and the Internet 203.

Figure 3:
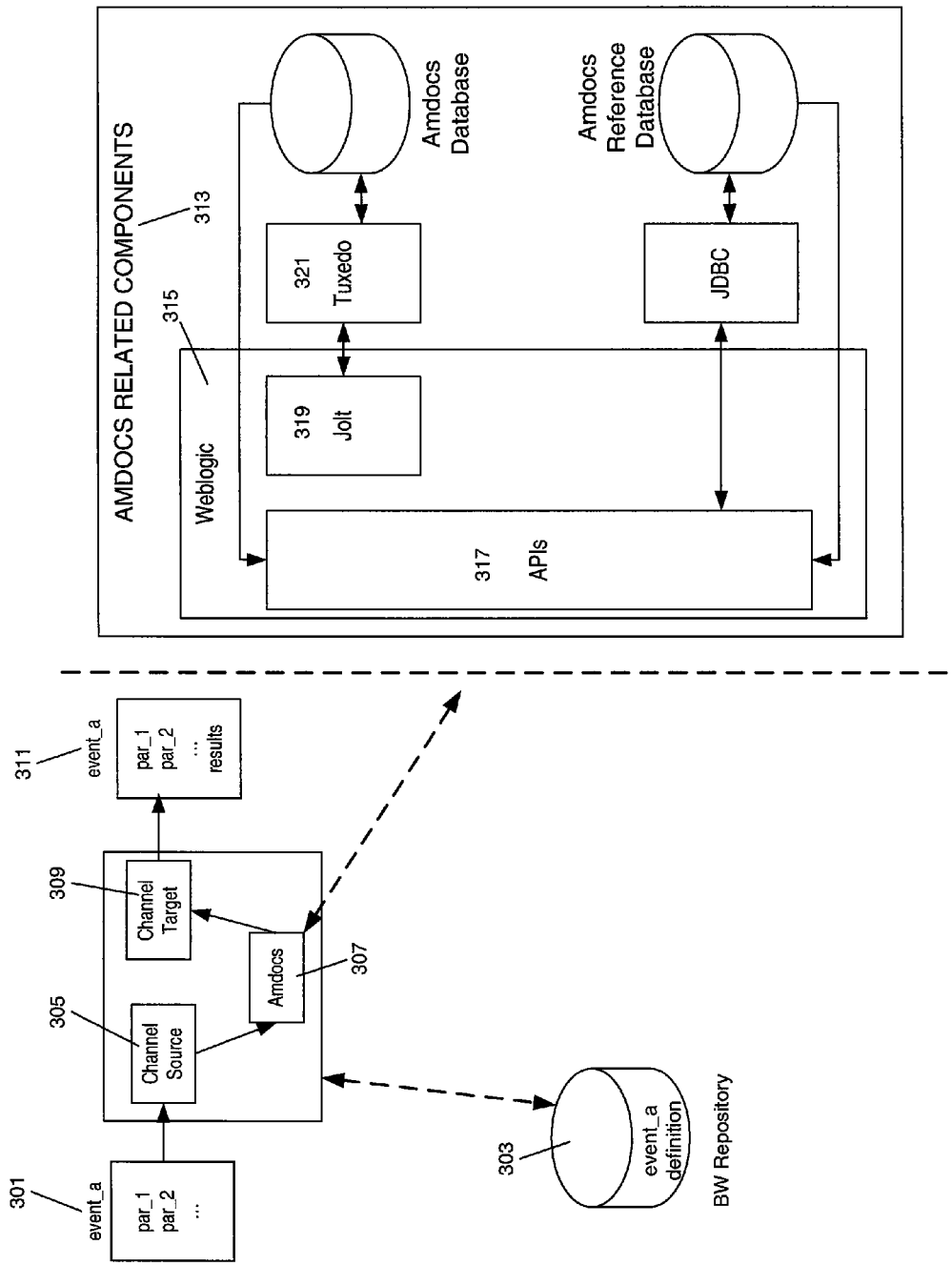
FIG. 3 illustrates a general Vitria™-AMDOCS™ system architecture showing the use of connectors.

FIG. 3 discloses an exemplary embodiment of the present invention in the context of a Vitria™ system coupled to an Amdocs™ application system 313 via a connector of the type described in this invention. In FIG. 3, an event object 301 originating in the Vitria system is passed via the channel source part 305 to the connector 307. The connector 307 checks the event object 301 against the IDL structure in the BW repository 303 and determines which EJB software object of the Amdocs API 317 to invoke and which methods to invoke on it and in what order. The connector 307 invokes the methods found on the Amdocs API 317 that are part of the Weblogic component 315 of the Amdocs system. The Weblogic component 315 will process the invoked method either via Jolt 319 or via the JAVA programming language API for executing SQL statements (JDBC), and will return the results of the invocation of the method to the connector 307. The connector 307 will collect the results of the various methods invoked as a result of the event object 301 which it received, and will transmit these results object 311 back to the source system (Vitria in this case) via the channel target process 309.

It is the creation and use of generalized Target-Source Connectors that is the subject of the current invention, which is described in more detail below. Such systems are typically constructed using Object Oriented Programming techniques and methods, using the JAVA programming language and system, related object systems, object IDL, ENTERPRISE JAVA BEAN (EJB) software objects, JAVA BEAN software objects, and related technologies, all of which are known to those skilled in theses arts.

General Overview

Building a Vitria connector to an API made available as a set of ENTERPRISE JAVA BEAN software objects, the main design goal is to enable generic handling of these beans by specially formed Vitria events without need of generating JAVA programming language code for each business event defined. A business event can be defined as an event that can have one or more system events interacting with an end system to achieve the overall transaction goal for the business event. For example, a business event could be one of "create billing account" where several system events could be: "look for account already created, find parent account, create tentative account holder, add name, add address, add credit class, etc." Vitria will contain the single business event to be fulfilled while the connector would process the event and handle each system event that is required to complete the overall transaction. The scope of this connector can handle an entire business event as long as it only has to interact with a single session bean. The methods of this session bean enable various system events to be executed as well as the final commit.

Since Vitria connectors manage Vitria events as JAVA programming language value objects (stubs generated from IDL definitions) with no methods, a design pattern is devised to allow this connector to traverse a hierarchy of these objects to determine the business logic needed to be executed. This logic includes which bean to call, the methods (i.e. system events) on the bean to call and the order of method invocation, the simple or complex (value data objects) parameter lists to be passed to these methods and any expected results to be processed and stored in the new event.

The following EJB software object handling capabilities are enabled in this design that are configurable by the way the Vitria event definition is configured:

Selection of an EJB software object method by business event
  a) Ability to reuse the same EJB software object for multiple business events (one-to-many)
Methods on the EJB software object
  a) Order of method invocation
  b) Varied repeating methods (arrayed)
  c) Optional methods
  d) Overloaded methods (limited to parameter identification of class name but not package)
Data type parameters for each method
  a) Can be simple JAVA programming language data types, Strings, Dates
  b) Can be value container classes with either public member variables, public accessory methods (or both)
  c) Can be arrays of the previous data types/classes
  d) Can have nesting of container classes (one container class holds an instance of another)
  e) Can be configured for optional parameters of all of the above except optional arrays (though these arrays can be empty) where null is passed
Handling information returned by the methods
  a) Can be all of the data types as that of the parameters
  b) Bundles the resulting return Vitria event with the original data PLUS the new results for all the methods in the business event as one object.
Handling local value container data type validation exceptions and EJB software object remote exceptions in a generic fashion to either capture the errors in the returned event or by means of the Vitria error event framework and either continue or stop due to connector flow settings.
Configurable special events that will invoke special plug-in classes for EJB software object that do not conform to the assumptions of the generic case or for performance consideration.

The connector framework is broken into several object classes/areas:
  a) Handling the J2EE environment connection, context login information and candidate home EJB software object references in a hash table
  b) Generic handling facilities for consuming and building data container objects representing Vitria events when calling and retrieving results from the objects.
  c) Wrapping Vitria logging capabilities in a new class, etc. for allowing client testing of connector functions independent of needing Vitria running
  d) Plug-in class capabilities/controller for handling special case treatments of beans as necessary
  e) General Vitria connector framework needs property sheets, flow interfaces, etc.)

Connector Overview

The Vitria-Amdocs connector enables manipulation of Amdocs APIs (Weblogic ENTERPRISE JAVA BEAN software objects) by means of well-defined Vitria events. For each of these Vitria events, the connector will obtain a bean, invoke methods on the bean in a pre-defined order with data from the event, and collect the results from the method invocations to pass on to the next flow in the Vitria connector model. All of this is done without need of knowledge of the beans themselves by the connector, their methods or the business logic in how to use them. The details on these points are kept in the event definitions that are controlled in IDL specification used by Vitria. The connector "walks" through the Vitria event data object, attempting to match the fields and sub-fields against EJB software object methods, their parameters and return values. Business logic validation is performed by the EJB software objects themselves (such as used in Amdocs APILink) and data/requests that fail the validation are passed transparently back through the Vitria connector and into Vitria's error handling processes.

1.1 System Background 1.1.1 Amdocs APILink

APILink is a standardized interface for the Amdocs Ensemble products as it overlays on top of the Ensemble CSM Tuxedo services in the form of Weblogic EJB software objects using BEA's JOLT. This enables HTML web pages to perform the same operations as available in the CSM PowerBuilder client thus making a "thin" client version of the product(s) available. However, APILink can also be used for interfacing directly to other applications by use of its EJB software objects. Due to the highly customized nature of an Ensemble installation for each client, separate installations of APILink usually vary in available method calls, data types, etc. Additionally, the APILink interface has been going through revisions over time and it cannot be guaranteed that an existing client will be using the latest version of the interface—thus having different interfacing signatures.

To overcome these obstacles, this connector handles these EJB software objects generically without need of specific knowledge of an implementation, provided that Amdocs continues to follow certain EJB software object framework guidelines. The connector uses details in the Vitria event data definition itself to walk through the population of method parameters and capturing of results from bean method invocations.

1.1.2 Weblogic Enterprise Java Bean Software Objects

APILink is currently running under Weblogic Application Server v5.1. Weblogic EJB software objects that form APILink are accessible via an environment context that is achieved once a client is logged into the Weblogic environment. Each API EJB software object has a home interface bean that is available through the context that can create remote (server-side) instances of the bean.

As part of its component-based design, the Weblogic environment handling is abstracted from the main Vitria connector logic (flow). This connector component enables the connector to log into a Weblogic environment at start-up and each Vitria event causes the creation/process/removal of these EJB software object instances.

1.1.3 Vitria Connector Flow

A connector flow is an object used in a Vitria connector model to receive, process and send Vitria events through the connector model. A target flow is a flow that accepts a Vitria event and passes this information to an external application (usually by means of the application's API). The Vitria connector flow for connecting Vitria to Amdocs is a Target-Source flow which will accept specially designed events with data, manipulate the Amdocs API via Weblogic EJB software objects, and the results will be passed back into an event of the same format (IDL specification) to be further processed by the connection model. Vitria uses flows to encourage re-usability of components and work between connection models as they participate in the transaction of passing/changing/formatting the events without knowledge of the other flows operating in the same connection model.

1.2 Implementation Obstacles/Needs in Integration

The following limitations of the participating systems (Vitria, Amdocs, etc.) are described below to illustrate the scope of functionality needed by the connector design/functionality.

1.2.1 Handling Business Logic Generically in the Connector

To keep transparency from business logic, the connector handles all incoming Vitria events in a fashion that is not hard-coded into its logic. If defined correctly (in IDL), each event can specify which EJB software object to use, the methods to invoke on the EJB software object, and the data to be passed between Vitria and the EJB software object without need of coding. The use, ordering and data are all provided in the structure defined in the event itself. In addition to normal operations, the connector can also capture business-level data validation errors that are thrown as exception by the EJB software objects and perform special user-defined handling.

1.2.2 Transaction Participation/Control

Amdocs APILink does not currently implement a form of transaction control. The transaction boundary extends from the Ensemble database(s) to Tuxedo/Weblogic only where consistency is maintained from the Weblogic environment to the back-end database(s). Due to this limitation, external systems using their EJB software objects cannot guarantee transactional behaviour for the complete event nor each individual EJB software object method invocation that calls the database. Fundamental architecture changes are required by Amdocs to effectively address this issue. A potential problem that could arise is the failure during the process of creating an entity, between the store/commit and then calling methods to get the results. If this occurs, the key could be unknown and thus may require manual intervention.

To address this issue, the connector enables certain behaviours to improve the manageability of such exception cases. These range from how the connector should behave when the machine(s) running Vitria BusinessWare fail to record additional logging of the entire event itself. Some of these behaviours are controllable as parameters on the flow bean interface.

1.2.3 Handling Default/Optional Parameter Values

EJB software objects could receive and return values of null in place of arrays, JAVA programming language Strings, JAVA programming language Dates and other complex data types (objects). However, Vitria event data are always initialised and therefore cannot hold null values. The connector facilitates handling of null in the data exchange between Vitria and the EJB software objects by a series of rules controllable as connection flow parameters. Based on the desired preferences, the connector will pass null and will handle values that return null from the EJB software object.

1.2.4 Solution Expansion for Performance and Future Needs

There may be cases in the future where Amdocs chooses to deviate from the assumptions listed in this document. Also, events with large number of calls that are complex can sometimes require duplicate information to be provided to several events, etc. Due to these points, a special process is available to deal with these cases.

The connector allows for "special" event handling that will identify the incoming events and call the corresponding plug-in class for handling this special case.

Transaction control, handling NULL values and special case handling are discussed in more detail below.

2. Connector Functional Scope/Capabilities

The following outlines the functional capabilities available in the exemplary embodiment of the invention and those areas that are not possible or not in scope for this exemplary embodiment.

2.1 EJB Software Object Constraints Handled by this Connector

The EJB software object characteristics supported by this exemplary connector embodiment are as follows. This framework is intended to support Amdocs EJB software objects. However if other EJB software object vendors adhere to this framework this connector should be compatible.

2.1.1 EJB Software Object Access and Handling

The EJB software objects are accessed first by obtaining an environment context via Weblogic methods. This is done using a URL for the Weblogic server, a user name and a password.

From the Weblogic context, the connector will support all beans with the same JNDI name prefix (i.e. "amdocsBeans" in amdocsBeans.NewCustomerConvHome, etc.). Beans available under different naming prefixes will require separate connector flows to be defined to handle beans in different namespaces. At least one JNDI prefix is mandatory in order to make the EJB software objects available thought the Amdocs connector. Examples of full valid JNDI names are a) amdocsBeans.NewSubscriber b) amdocsBeans.subContext1.subContex2.UpdateCustomerData (For both listed above, the prefix could be "amdocsBeans").

Access to the remote interface is achieved by invoking the "create" method on the EJB software object home object with no parameters. The creates method is a typically implemented by EJB software object application vendors though not required. When this method is present, it will invoke the standard "ejbCreate" method as dictated by the EJB software object framework to obtain the remote interface/session.

The connector only manipulates public methods on the bean. It will not attempt to access data members if available.

Therefore all data members to be accessed on a bean require public accessory bean methods.

At the completion of a transaction, the connector will call the "remove" method on the bean to attempt to clean up the server-side memory of the session.

2.1.2 EJB Software Object Methods and Method Invocation

The connector uses the IDL/Vitria event data structure to understand the order of method invocation on a bean. In cases of method overloading where multiple EJB software object methods with the same name are available, the connector will try to isolate a match first by number parameters and if needed, parameter types. Parameter types are limited to identification of class names only (not the full qualifying name including its package).

Bean methods supported can accept one or more input parameters, return values, or both.

Bean methods are supported if they all input parameters and return values that follow the supported data types below.

2.1.3 EJB Software Object Data Types Supported

All primitive data types are supported: boolean, byte, char (character), short, int (integer), long, float, and double.

JAVA programming language Strings and Dates are supported (java.lang.String and java.util.Date).

Complex data types are supported if they follow the following:

1. Can be represented by their short name without need to use their full qualifying class name (i.e. no ambiguity). It is generally good practice to keep complex data types to the same data class package (i.e. amdocs.csm3g.datatypes.*).
2. Do not contain references to other beans (thus the meaning of "data" type).
3. Contain only data types supported as mentioned in this section (sub-complex data types are valid).
4. Contain other complex data types, there should be no circular class references declared that are required (i.e. class a contains member of class b, class b contains a member of class a . . . ).
5. Make accessible their data members by either having public access to them or to have valid public accessory methods (get and set).
6. Do not require any method invocation order for their accessory methods (if applicable).

Where applicable, valid accessory methods exist as the data member name prefixed by either "get" or "set".

Valid get accessory methods take no parameters and return the private member. The private member has to be a valid data type listed in this section.

Valid set accessory methods return nothing (void), and accept only one parameter of the same type as the private member. The private member has to be a valid data type listed in this section.

Valid data types can also be single-dimensional arrays of the mentioned data types in this section (i.e. primitive, String, Date, complex).

2.2 Known EJB Software Object Variants Which may not be Supported by a Particular Connector Implemented in Accordance with the Present Invention a) Creating EJB software objects using a home interface create method that requires input parameters. This practice in creating such EJB software objects is considered non-conventional.
b) Passing "optional" arrays as parameters to EJB software object methods when null is required.
c) Data types with set or get methods that are not of the form described in the previous section
d) Multi-dimensional arrays 3. Installation Process In the preferred embodiment, the majority of the connector is built in the JAVA programming language and thus should be transparent between operating systems. Even though this is the case for most of the source code, the environment settings, variables, JAVA programming language class paths, etc. differ slightly. The following sub-sections detail the process for both Windows NT™ and Solaris™ environments as sanctioned by Vitria.

3.1 Connector Details

The following connector details describe the requirements and components of the installation:

3.1.1 Connector Requirements

The following system configuration is required

| | |
|---|---|
| Operating System | Windows NT or Solaris Unix as supported by Vitria |
| Vitria BusinessWare version | 3.1.x |
| JAVA Runtime Environment | 1.2.2 (Java 2) |
| EJB Environment | Weblogic 5.1 Service Pack 10. The machine that runs the connector needs the Weblogic files to be in the class path in order to successfully connect to the Weblogic server. |

3.2 Installation Differences on Windows NT vs. Solaris UNIX

The primary differences found for connector installation on Solaris UNIX (8.0) from Windows NT are as follows:

a) Environment variables such as CLASSPATH are specified as $CLASSPATH instead of % CLASSPATH % on NT
b) Directories are separated by "/" instead of ".backslash." on NT
c) Class path separators are specified as ":" instead of ";" on NT.
d) The Vitria subdirectory paths for both JAVA programming language class files and system-dependant binary executables are named "win32" on NT and "sparc_solaris" on Solaris (such as specified as subdirectories under (Vitria path) . . . \bin and . . . \java).

The only system-dependent file that is required by Vitria for this connector is a linked library called "vtAmdocsLocale3_o2r.dll" under the (Vitria . . . ).backslash.bin path on NT and called "libvtAmdocsLocale3_o3gri.so" on Solaris 8.0.

All provided ".class" files are system-independent (as per the JAVA programming language specification) and therefore require only copying to the correct location on the Solaris machine. The files will work on either system.

3.3 Connector Files

The following files are deployed at the successful completion of the connector installation. All files assume to be deployed to Vitria installation path specified by system variable % VITRIA % in Windows and $VITRIA in Solaris (for example: data.backslash.install could be C:.backslash.Program Files.backslash.Vitria.backslash.BW31.backslash.data-.backslash.install where % VITRIA %=C:.backslash.Program Files.backslash.Vitria.backslash.BW31 on NT and $VITRIA=.backslash.usr.ba-ckslash.local.backslash.BW31 on Solaris):

| File Path/Area | File(s) | Operation | Description |
| --- | --- | --- | --- |
| bin\win32 | vtAmdocsLocale3_o2r.dll | File Added | File Library executable that is specific to Windows NT/2000 |
| bin/sparc_solaris | libvtAmdocsLocale3_o3 gri.so | File Added | File Library executable that is specific to Solaris UNIX |
| data\install or data/install | AmdocsConnector.ini | File Added | Connector INI for use by Vitria |
| interdef | (IDL file) | File Added | Example IDL that could be used by the connector |
| java\win32 or java/sparc_solaris | getBeans.class | File Added | IDL building tool that connects to a Weblogic server and compiles a list of available beans |
| java\win32 or java/sparc_solaris | IDLBuild.class | File Added | IDL building tool that allows for user interaction to automate the IDL generation process |
| java\win32\... or java/sparc_solaris/... | Connector Java class files | File Added | JAVA class files that implement the Connector in in the package com.accenture.vitria.amdocs.connector and com.accenture.vitria.amdocs.connector.tools |
| java\local or java/local | Java files(s) generated by the Vitria jstubgen utility | File Generated | This process is normal during the importing and registering IDL for events in Vitria. |
| data\install or /data/install | vtInstalled.cfg | File Modified | This file lists the connectors installed. On initial installation, this connect requires the line "AmdocsConnector" Appended. |

4. Building a Connector Model: General Use Case

Figure 4:
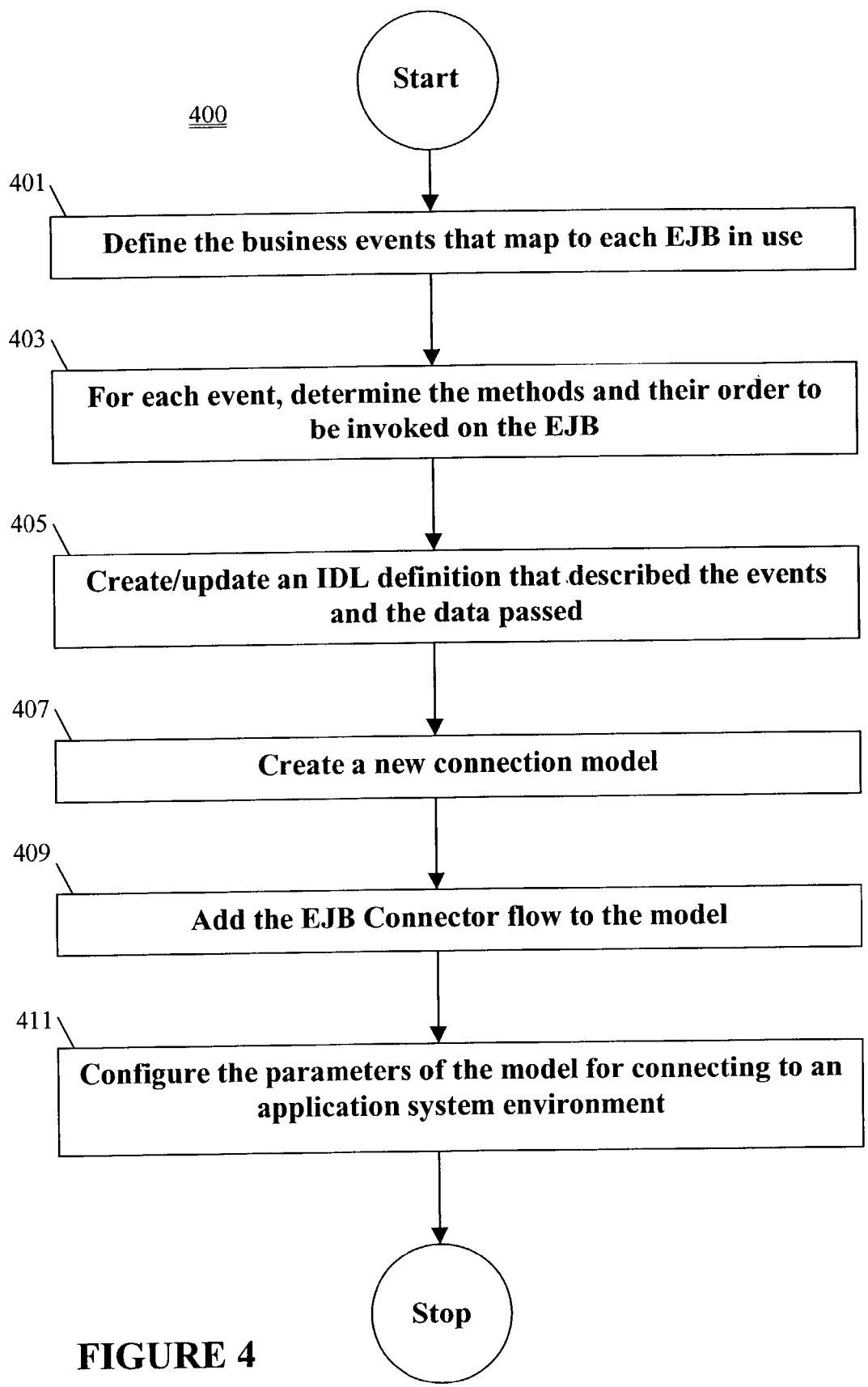
FIG. 4 illustrates a general flow diagram of the steps of the present invention.

Referring now to FIG. 4, a general process of the present invention is depicted, for how to implement/configure a generalized connector for an object oriented business system environment, as in the exemplary Amdocs-Vitria connector 400. In FIG. 4, the following steps need to take place:

a) Define the business events that map to each EJB software object in use 401, and for each event, determine the methods and their order to be invoked on the EJB software object 403.

b) Create/Update an IDL definition that describes the events and the data passed 405. This IDL and generated event data will be used by the connector that implements the business events by how the IDL is structured.

c) Create a new connection model 407 and add the EJB software object connector flow to the model 409.

Then configure its parameters for connecting to an application system environment 411 (such as the exemplary Weblogic environment) and to dictate options desired in connector flow behaviour.

a) Complete the connection model with other source, target and target/source flows, along with any error model handling.

4.1 Defining Business Events

Though most tool and connector processes automate the majority of the effort of defining events (such as the exemplary Vitria events) 401 and supporting IDL data structures, they still require definition of the business events that is a step required to be defined by the implementer. This step requires an understanding of which EJB software object will process the business event and which methods on the EJB software object that need to be invoked in a particular order 403. An event (such as the exemplary Vitria event) will represent this business event and this event cannot span processing over multiple EJB software objects for completion. It is valid for multiple events to use the same EJB software object (many to one).

4.2 IDL Generation

Once the business events are defined (event names given for each event, the bean assigned, and the bean method invocation order defined, etc.), IDL needs to be defined 405. This IDL needs to be imported and stubs generated in the event generating sub-system (such as Vitria) so that the connector can successfully identify the business events, process the data against the related EJB software object and return the results. A series of JAVA programming language tools provided with the connector automates most of this process. The following section(s) contain information on the IDL requirements and IDL tool generator.

4.3 Connection Model Configuration

Figure 5:
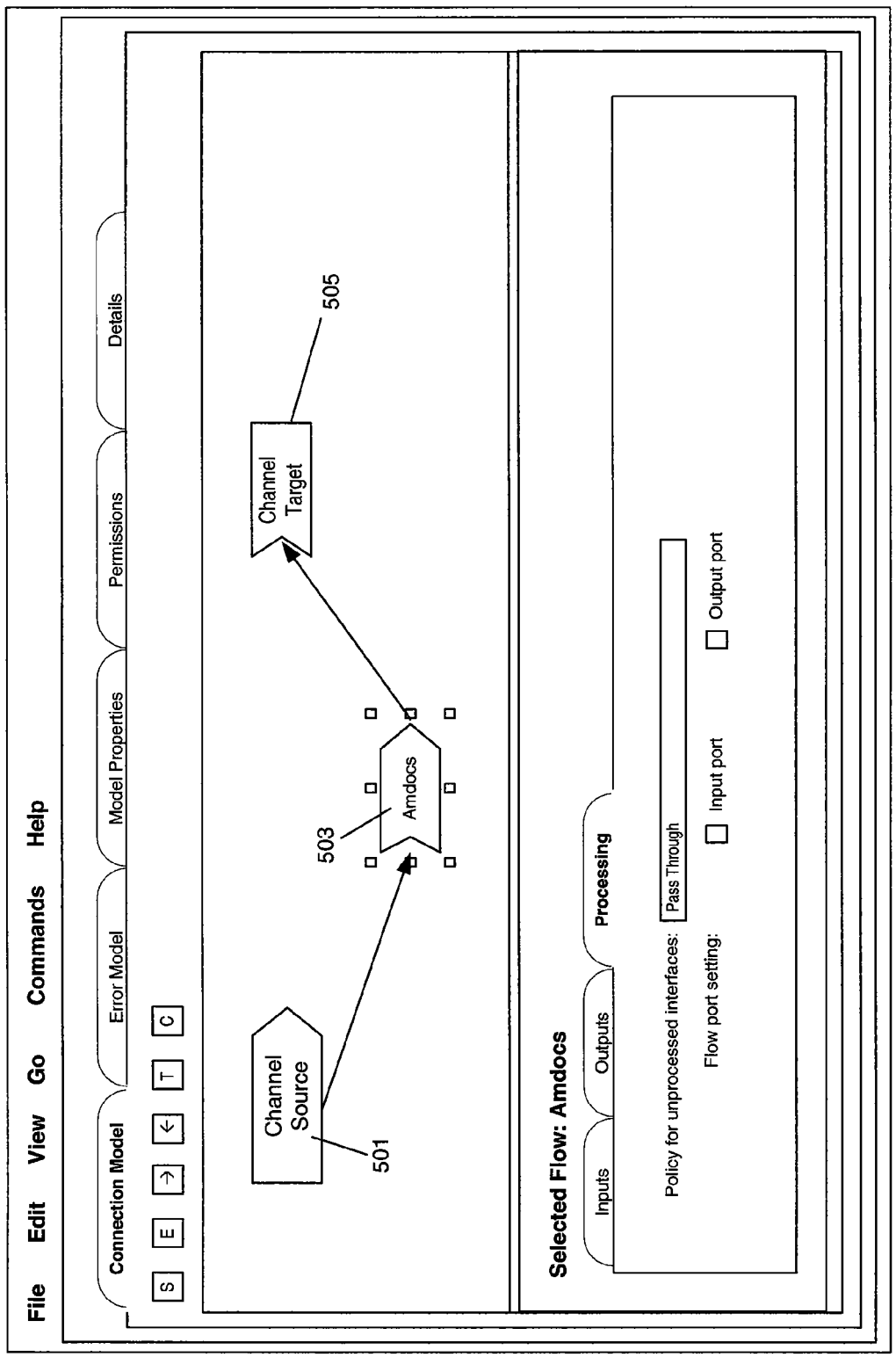
FIG. 5 depicts a screen shot of a basic connection model on a BusinessWare Console Admin screen.

To create a new connection model 407 to be used with the application system environment's EJB software objects (such as the exemplary Amdocs APILink EJB software objects), one can create, for example, a "New Amdocs Connection Model" that will create the following set-up:

Referring to FIG. 5, the basic connection model has a Vitria Channel Source 501, an Accenture-Amdocs APILink Flow 503, and a Vitria Channel Target 505 wired together as shown. The basic process is that an incoming event, properly defined, will be used by the APILink flow to process against a corresponding EJB software object, and the results and the flow then passes an event of the same kind as the incoming event that is essentially a copy of the original with results of method calls being added to the event data. This output event is then passed on to the next flow (which will be to a destination channel in the example above).

Before this model can be used, the APILink flow properties need to be configured as described in the following section. To do this, in the present invention one right-clicks on the flow selected (see FIG. 5) and selects the option "Properties."

4.3.1 EJB Software Object/Amdocs Flow Properties

The diagram in FIG. 6 shows the property sheet for the APILink 600 and the default values 601. At a minimum one needs to specify the Weblogic server URL 603 (if not already the default), User name 605 and Password 607. If desired, one can optionally provided a top-level module name 620 (Allow only events that belong to module) that will cause the flow to filter and only process events that belong in the module to be.

The following properties listed in the Property column 602 are configurable in the Amdocs APILink flow. Properties listed as "Advanced Settings." (The descriptions provided are also available on the Flow Property sheet at the bottom of the dialogue box 609.)

| Property | Description | Default |
| --- | --- | --- |
| Accept values that are null from Bean | Advanced Setting: This setting indicates if the connector will accept null values from EJB data types. If an object that may be a String, Data, other data types or arrays is received as null, the Connector will treat them as pre-established default values in Vitria data as empty strings, empty arrays, etc. Please refer to section 4.5.2 (Accepting Null Return Values from Bean Methods) for more details. | True |
| Allow to specify optional complex | Advanced Setting: This setting enables or disables support for specially defined Vitria event data to pass as null to EJB methods for input method parameters expecting complex data class types. True will enable this support. False will treat these event data during the processing as mapping errors. Please refer to section 4.5.1 (Providing Null Parameter Values to Bean Methods from Vitria) for more details. | False |
| Allow only events that belong to module | Optional. This prefix should reference the highest-level module you defined that contains the events the flow will accept. Leaving this blank will cause the flow to not filter the incoming event. Please refer to earlier in this section for more details. | (None) |
| Commit after | Vitria default (determines who initiates the transaction). Not discussed here. | False |
| JNDI Binding Name Prefix | Required. This value is the prefix that will be appended all bean names defined in the event spec. This <prefix>.<bean> is used to locate the Weblogic Container to use during event processing. Only one prefix can be used per instance of this connection flow. Please refer to section 6.2 (IDL "Walkthrough" Process) for more details. | amdocsBeans |

-continued

| Property | Description | Default |
| --- | --- | --- |
| Log Level | Vitria standard. Setting the log level to the highest setting is recommended when trouble-shooting Weblogic connection and/or event processing problems. | (Vitria's default) |
| No Dates Pass Null To Bean | Advanced Setting: This setting controls connector flow behaviour when data from a Vitria event supplies a blank String value that will be converted to a JAVA Date object for input to a bean method. A setting of True passes to the bean null for the Date value. A value of False passes the current system date/time of the environment running the connector. Please refer to section 4.5.1 (Providing Null Parameter Values to Bean Methods from Vitria) for more details. | True |
| Password | Password that the connector will use to gain access to the EJB environment. | (None) |
| Participates in transactions | Advanced Setting: this setting allows the connector to either implement the "one-phase" transactions process or not implement any form of transaction control inside the connection model. A connection model can have only one source or target flow that uses a one-phase transaction resource. Therefore, if two Amdocs connectors are needed in the same connection model only one can have this property set to true. | True |
| Prefix for names of Plug-In Events | Advanced Setting: Prefix for identifying events that should be treated with a special plug-in class. Warning: modification to this setting should be done prior to any IDL and/or JAVA plug-in classes are developed. Please refer to section 5.2 (Process of Creating a New Plug-In) for more details. | "spec_" |
| Rollback events being processed during machine failure on start-up | To guarantee that events are not lost, set to (true) else (false) will help avoid duplicate processing. Please refer to section 4.6 (Recovery Behaviour) for more details. | True |
| Send bean application errors to connector error model | Flag to determine what happens when a bean throws an exception (usually when the bean's business/application logic determines invalid data, etc.) Setting to true will cause an error to be sent to the connector error model. False will treat it as normal (the status parameter in the event will still contain the error information for use later). Please refer to | False |

-continued

| Property | Description | Default |
|---|---|---|
| | section 4.4.1 (Bean Application Errors) for more details. | |
| Send data mapping errors to connector error model | Flag to determine what happens if data mapping failures occur between an event and a bean. True sends the error to the connection error model (normal case). A value of false will cause the flow to ignore the error and instead pass-through the original event to the next flow in the connector model. Please refer to section 4.4.2 (Mapping Errors) for more details. | True |
| String Value If Null | Advanced Setting: If null values can be passes as String values to bean, the connector will do so when the value of the String matches this value. Please refer to section 4.5.1 (Providing Null Parameter Values to Bean Methods from Vitria) for more details. | "null" |
| Strings Values Can Be Passed as Null To Bean | Advanced Setting: This setting indicates if the connector will look for a specific String value to tell it to pass null to the bean instead of a String value. If this setting is True the connector will compare the 'String Value If Null' parameter value to the value provided by the Vitria Event and the connector will send null on matches. If this setting is False, the connector will ignore the 'String Value If Null' setting and always pass the String. Please refer to section 4.5.1 (Providing Null Parameter Values to Bean Methods from Vitria) for more details. | False |
| URL | URL and port number of the Weblogic Server environment that the connector will use to gain access. The default assumes a firewall tunnelling is required. If not, the t3 protocol should be used to obtain a connection to the Server. HTTP is used when firewall tunnelling is needed. If the Weblogic server is not accepting HTTP tunnelling, please refer to the troubleshooting section later on in this document. | "http://localhost: 7001" |
| User | User ID that the connector will use to gain access to the EJB environment. | (None) |

4.3.2 Error Model Configuration

Figure 7:
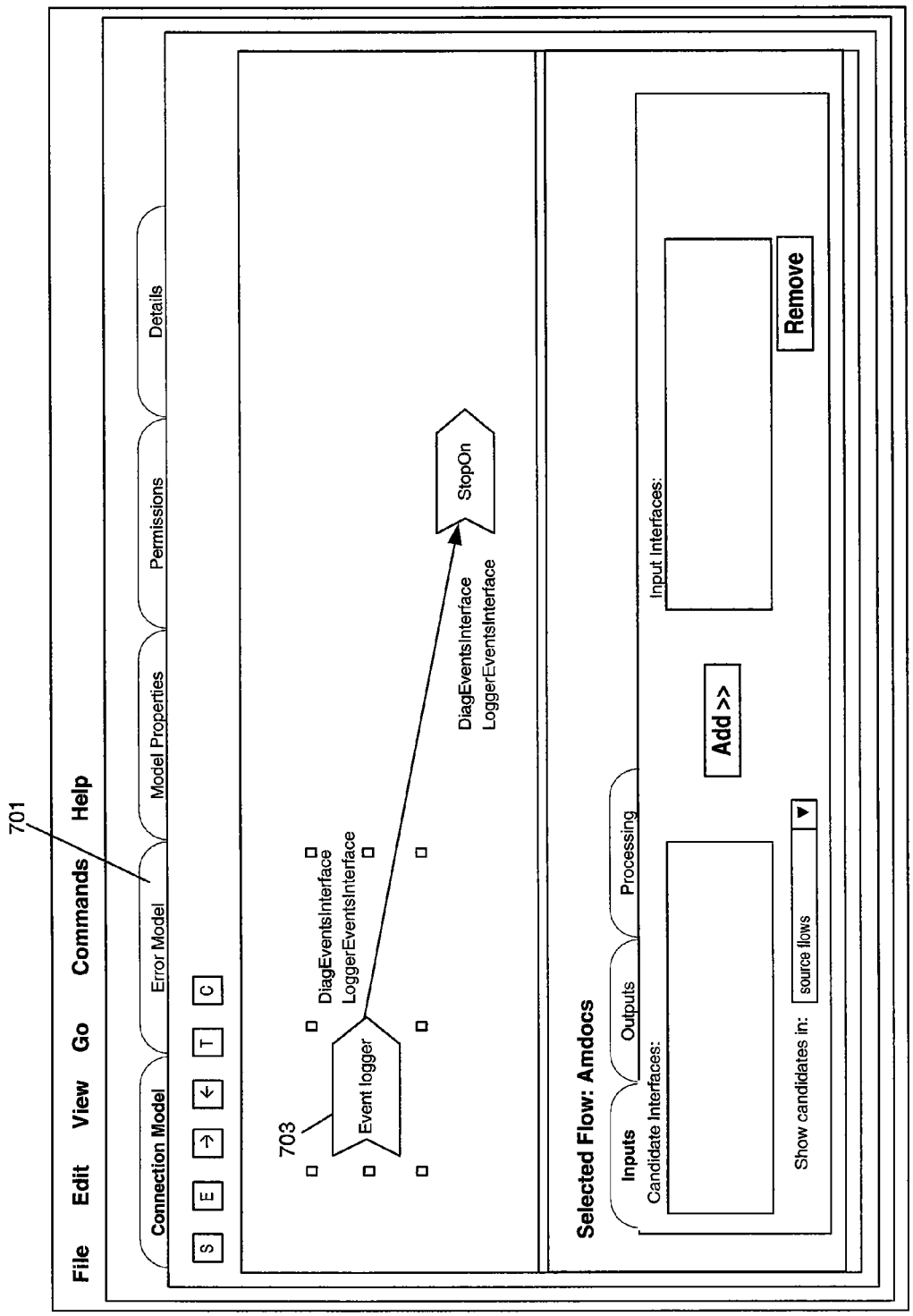
FIG. 7 depicts a screen shot of an Error Model connection screen
Figure 8:
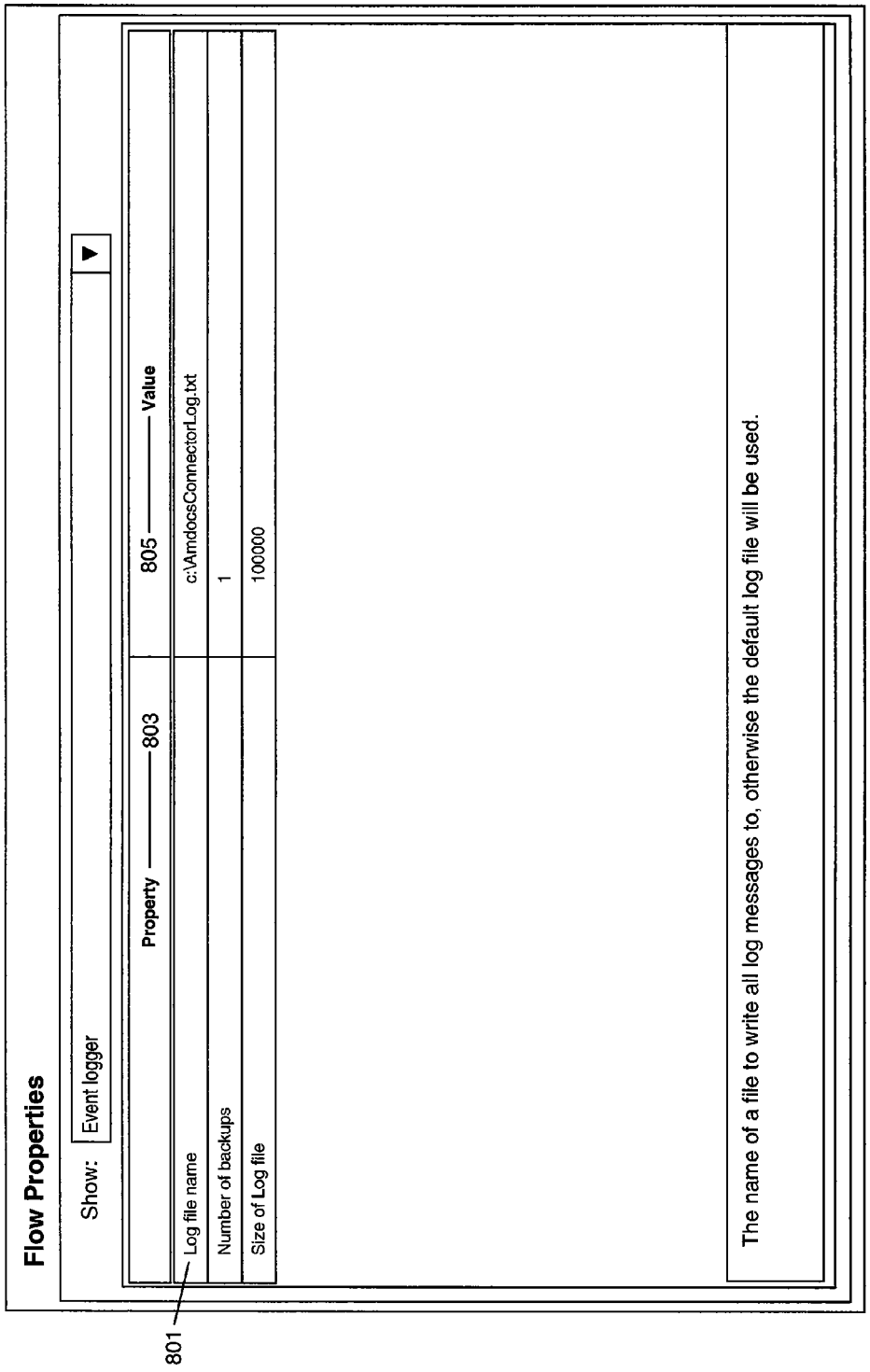
FIG. 8 depicts a screen shot of an Event Logger Properties screen.

When creating a connector model (such as for example, an Amdocs Connector Model), it is suggested to always configure the error connection model to treat abnormal connector behaviour, EJB software object data errors, etc. At a minimum, it is suggested to specify a dedicated log file name and path. See FIGS. 7 & 8 to see how this can be achieved:

1. On the connection model, select the tab "Error Model" 701 in FIG. 7.
2. Right-click on the Error Logger flow 703 (shown as selected)
3. Specify the path/file of the log file under the "Log file name" property (801 in FIG. 8).

The APILink flow will send errors to this module of the following kind:
   a) Bean Application Errors (default: configurable via the flow property "Send bean application errors to connector error model" (609 in FIG. 6)).
   b) Data Mapping Errors (not default: configurable via the flow property "Send data mapping errors to connector error model" (611 in FIG. 6)).
   c) System Errors (all errors).

As a default, the Error Model will "stop on" (i.e. stop the connection model execution) on all events sent to it. This behaviour can be changed, for example as per normal Vitria BusinessWare connector configuration steps specified in vendor documentation.

4.3.3 Connection Model Properties

Figure 9:
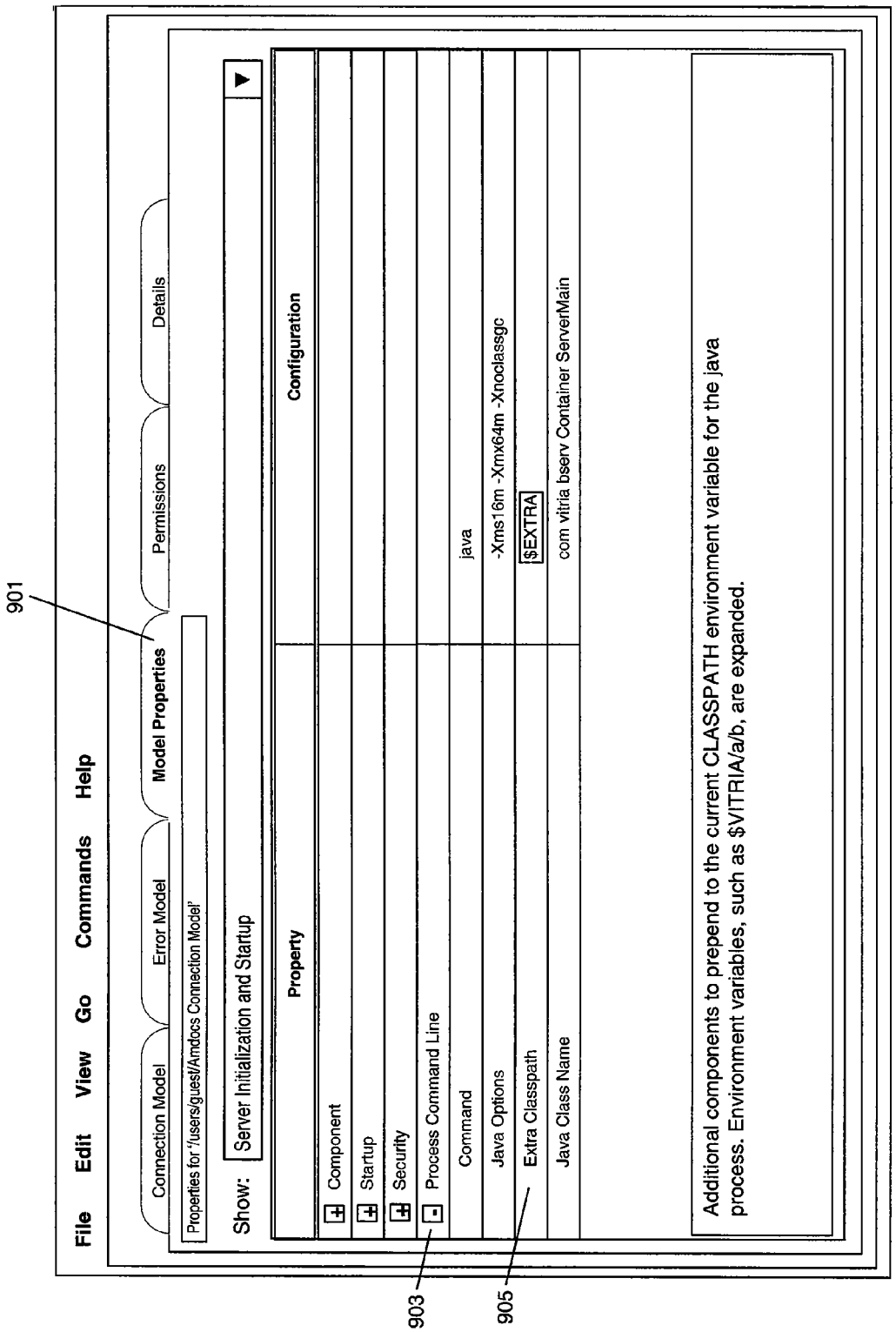
FIG. 9 depicts a screen shot of a Server Initialization and start-up properties screen.

To correctly access the application system as for example, the Weblogic environment, additional directories may need to be specified to use vendor's classes if not already available in the CLASSPATH of the user used by Vitria BusinessWare. For convenience, one could assign a system variable such as "EXTRA" to make available these directories. Referring now to FIG. 9, if these directories are required to be added for correct functioning of the connection model:

1. On the Connection Model, go to the "Model Properties" tab 901, expand the "Process Command Line" property 903
2. Add the extra directories of the required Weblogic directory path(s), EJB software object data type classes, etc. (as needed). (The example in FIG. 9 simplifies these defaults by providing a system variable defined as EXTRA 905 that has the class path details.)

In the exemplary embodiment, at minimum, the following classes/paths need to be specified in the EXTRA classpath:
weblogic510sp10jar (service pack 10)
{WEBLOGIC_HOME_DIR}.backslash.classes.backslash.
{WEBLOGIC_HOME_DIR}.backslash.lib.backslash.
   weblogicaux.jar
   (For a typical installation of the Weblogic Server on a NT machine WEBLOGIC_HOME_DIR is c:.backslash. Weblogic)

It is relevant to note that none of the EJB software object classes, neither home interfaces nor remote interfaces classes, are required on the connector side. Therefore, as long as there are not any plug-ins implemented (see the description below) it is recommended to avoid adding these classes in the EXTRA classpath.

4.4 Error Model Features

There are three classes of errors handled by the exemplary connector:
   a) Bean Application Errors (Exceptions)
   b) Mapping Errors
   c) System Errors All three can be sent to the Error Model in the Connection Model to allow for flexible handling of different errors that occur (such as stopping the connector flow execution that will halt event processing, reporting errors to error-handling routines via special channels, etc. The following subsections describe each class of error separately.

4.4.1 Bean Application Errors

Exceptions thrown by the EJB software objects during method invocations are handled as bean application errors (also known as "Bean Unhappy" errors). These exceptions are thrown when event data provided is invalid or for other reasons determined by the application business logic. The connector is transparent to application business logic and will not directly throw such exceptions. Instead the connector flow will capture these exceptions thrown, obtain the error details and pass the information back without treating the error.

The connector flow is configurable on how to direct the application error. It can either treat the error as normal behaviour and record the error in an updated status parameter for the event that will be passed on to the next flow in the connection model (default) or send the error to the error model. This behaviour is dictated as a flow property called "Send bean application errors to connector error model" (609 in FIG. 6) where true will send the event to the error model and false will not.

For bean application errors that are sent to the Error Model, in the exemplary embodiment, they will have the following error code and sub-code: Major Code=101200, Minor Code=101210.

4.4.2 Mapping Errors

Mapping errors occur when the connector fails to find proper EJB software objects, bean methods, data parameters, or method results using the Weblogic environment while processing an event. Most errors will be due to poorly defined IDL definitions or due to changes in EJB software objects on new deployments to the server. The handling of these errors is to send them to the Error Model (default) or to simply specify them in the status event parameter for another flow or recipient application to process. This behaviour can be specified with the flow property called "Send data mapping errors to connector error model" (611 in FIG. 6) where true will send the error to the error model and false will not. The level of tolerance for what constitutes a "mismatch" is adjustable via advanced flow property settings (such as handling null values, etc). When such error occurs, no further method invocations will occur for the event.

For mapping errors that are sent to the Error Model, in the exemplary embodiment, they will have the following error code and sub-code: Major Code=101200, Minor Code=007.

Note: Such errors should not occur during production if thorough testing has been performed during development/configuration.

4.4.3 System Errors

System errors occur due to unexpected internal failure of the connector, application system (such as Weblogic) server failure, invalid application system (such as Weblogic) logins, bad URL, etc. These errors are not due to application data problems and all system errors will be sent to the Error Model in the exemplary embodiment with a default error sub-code of 911. In most Error Model configurations, this will stop the connection model processing (in some cases, foe example, throwing the light indicator on the console to yellow).

All system errors will be sent to the Error Model. In the exemplary embodiment, the error will have the following error code and sub-code: Major Code=101200, Minor Code=911.

4.5 Handling Null (Advanced Property Settings)

As mentioned above, in the exemplary embodiment, Vitria does not hold values of null in their event data structure. However there will be times where the connector expects null to be passed to its methods when its parameter(s) are optional or unused. Conversely, bean methods and/or bean data type accessory methods could return null that will need to be handled. The following sub-sections describe the options available that can be set on the connector flow to handle such behaviour. These behaviours can only be configurable at the flow level and not at the event level. To accommodate event-level behaviour, it is suggested that separate flows are used with different configuration settings and that the events requiring particular treatment be routed ahead of time to the specific flow. In the exemplary embodiment, in all cases, there will never be null values either required or returned by the EJB software object for primitive data types. Primitive data types will always be initialised (as per the JAVA programming language specification).

4.5.1 Providing Null Parameter Values to Bean Methods from Vitria

In the exemplary embodiment, except for "optional" array parameters (null), the connector can be configured to pass null to EJB software object methods by specially defined event data in Vitria. When optional values are not provided, these usually exist as "null" (i.e. not initialised). These null values can be in place of bean method parameters or member fields of complex data types. The following table describes the behaviour of each data type supported by the connector to pass null:

| Data Type | Vitria event format for passing null | Default Behaviour |
|---|---|---|
| JAVA primitive types | (Not applicable) | (Not applicable) |
| JAVA String Objects (java.lang.String) | When the connection flow property "String Values Can Be Passed As Null To Bean" is set to true and a Vitria event string data field equals the value of the connection flow property "String Value If Null" (such as "null"), the connector will ignore the Vitria string and instead pass null in its place. | String are always defined (non-null) |
| JAVA Date Objects (java.Util.Date) | JAVA Date objects are represented as strings in Vitria. When the connection flow property "No Dates Pass Null to Bean" is set to true, empty (" ") string fields in Vitria event data will be passed as null in place of a Date object to the bean method. A value of false will default the Date object to the system date. | Blank string fields in Vitria will be passed as null to bean method parameters expecting Dates |
| Complex Data Objects (EJB data classes) | Since Vitria always initialises its event data stub class members, to handle them as optional requires them to be represented in IDL as <sequences> (i.e. arrays). When the flow property "Allow to specify optional complex" is set to true, the connector will allow a Vitria IDL - EJB method signature array mapping mismatch as follows: empty array passes null as the parameter, otherwise array of size one will be passed as the component type. When setting the flow property to false, the connector expects a complex data object (non-array) to represent the EJB method parameter. Regardless of property setting, if the array size is greater than one or the component type of the array is not complex, a mapping error will still be generated. Note: supporting optional complex data classes imply that a Vitria transformer creating the input event will need to handle array creation for this parameter which may not be possible to be handled with the Vitria Transformer 2.0 flow. | Complex objects will always be passed (property set to false) |

-continued

| Data Type | Vitria event format for passing null | Default Behaviour |
|---|---|---|
| Arrays | Not supported. (This would require a similar approach to complex data objects that would imply multi-dimensional arrays in Vitria). | (Will always pass an empty array to the EJB method) |

4.5.2 Accepting Null Return Values from Bean Methods

Similar to the previous section, the connector is configurable in behaviour in accepting return values from EJB software object method invocations to be passed back to Vitria. This capability is not symmetric due to the fact that the data types in Vitria and used by the EJB software object are not symmetric (i.e. no null vs. null). For return values from the EJB software object, the flow property that dictates connector behaviour is called "Accept values that are null from Bean" (613 in FIG. 6). When set to true (the default), the connector will handle null return values from EJB software object methods except in cases where null is present and the expected return is a JAVA programming language primitive (indicating that the EJB software object data type was not primitive). A property setting of false will cause the connector to indicate a mapping error. In the exemplary embodiment, the following table describes what will result in Vitria when null is returned based on Vitria data type:

| Data Type | Event Data for Returned Values |
|---|---|
| JAVA primitive types | (Not applicable. Will cause mapping error). |
| JAVA String Objects (java.lang.String) | Empty (" ") string |
| JAVA Date Objects (java.Util. Date) | Empty (" ") string since Vitria is representing these EJB data types as strings in its event data. |
| Complex Data Objects (EJB data classes) | Default value that was set on default on the new initialised Vitria event data object. This means the members of this default object are 0 for primitive members, empty (" ") for strings, empty sequences (arrays) and initialised sub-event data classes for complex (recursion process) |
| Arrays (sequences) | Empty [ ] |

4.6 Recovery Behaviour

In the exemplary embodiment, for all source and target flows in Vitria, they participate in transaction control via use of a transaction resource. When an application system (such as a BusinessWare server) server failure occurs, this transaction resource is queried for the last state known prior to failure. The resource can respond by telling BusinessWare that the transaction was being prepared or was committed. The BusinessWare server will rollback and reattempt processing of the same event handled during the failure if the flow reports "Prepared". BusinessWare will drop events that have been reported "Committed."

In the preferred embodiment, the normal behaviour for target flows is to report "Prepared" when the actual status is undetermined. This avoids loss of any events due to BusinessWare server failure. However, there may be important events where one would desire to "lose" the event rather than to send duplicates. This could be the case where duplicate information will cause damage to the application behaviour or require significant manual intervention. In this case "Committed" could be specified.

The APILink/EJB software object connector flow allows for some flexibility in this participation and can be configured to support either "Prepared" or "Committed". This configuration is done as a flow property called: "Rollback events being processed during machine failure on start-up" (615 in FIG. 6). If this parameter is set to true, during such a failure the flow will report to BusinessWare "Prepared" (i.e. retry the event). Otherwise the flow will report "Committed," thus avoiding the possibility of duplicates. The default setting is true (as conforming to standard target flows).

5. Building a Connector Flow Plug-In: Advance Use

There may be cases where the Amdocs EJB software objects available may not conform to the general-case handling described in the base case. There may be situations when using the default processing is not convenient, efficient or possible to use. Addressing these cases, the connector framework is extensible to allow for special cases to be processed as in the form of plug-ins.

5.1 Plug-In Concept

The plug-in concept is quite simple: allow the end user to build extensions to the connector flow for special-treatment of handling an EJB software object. Plug-in extensions use the same facilities as the general case handling (determining which bean to call, maintaining log-in to the Weblogic environment, etc) while enabling a developer to add some limited business logic to the bean handling. All that is required is for the JAVA programming language plug-in to extend a provided base plug-in and to implement an abstract method specified on the base class. The implemented method on the plug in will access the EJB software object directly, invoking the methods, catching the exceptions, and collecting the return data from the APILink EJB software object methods. All logging, event system (such as for example Vitria) flow characteristics, application system (such as for example Weblogic) environment, etc. will still be handled automatically as in the base case.

When encountering an event with the name that has the special-event prefix, the connector will attempt to re-use the corresponding plug-in class to handle the event if it has already been used once during the connector operation (for performance reasons). If not found, it will attempt to dynamically load the JAVA programming language class. If the class is unavailable during runtime due to it not existing, bad CLASSPATH setting or invalid event name (misspelled) the connector will throw a system error (exception).

If the plug-in class is available, the method "process" will be invoked with request input parameter of the Vitria event, for example, and the obtained bean. The implemented "process" method will then directly manipulate the bean, passing data available in the request parameter to the bean methods, capturing method results and assigning them back to the request object, and catching and handling bean exceptions. An available method for changing the status object of the Vitria event, for example, is available to the "process" method for updating the status of the business event. Once completed, the "process" method will return the modified request object and control back to the connector flow.

5.2 Process of Creating a New Plug-In

The process of creating a new plug-in is as follows:

a) Define a new "special" event with a name that has the appropriate prefix in IDL. The prefix that is used by the connector to identify a special event is configurable on the flow property sheet under "Prefix for names of Plug-In Events" and is defaulted to "spec_". Note: Changing this property for the prefix should not normally be done. If special events have been defined and used prior to this change, they will require class name changes and rebuilding.

b) Define in IDL a data struct that will be passed to the event for passing data to and from the EJB software object. This "special" event has the same signature as the other events where it takes in two parameters: "request" and "status". The typical convention used is to declare the "request" data struct (type) for the special event in the same sub-module as the event's interface definition with the name of the struct given as <event name>_Data. (Example: special event called "spec_addCustomer" would have a related request data struct called "spec_addCustomer_Data").

c) Create a new JAVA programming language class using the JAVA template given. Implement the steps provided in the comment section of the template and save the new JAVA programming language file as the same name as the class defined. The template is provided for reference purposes in the Appendix of this document.

d) Compile the class using the utility "buildplugin.bat" (Windows NT) or "buildplugin.csh" (Solaris UNIX). Provided the session has the correct environment and CLASSPATH settings, the compiled JAVA programming language class will be put in the appropriate directory for the connector model to use.

e) Restart the connector as necessary.

6. Building IDL to Handle Logic for Business Events

Since the connector relies on the module definition used for the incoming event to determine which bean and order of the bean method invocation to fulfil the business event, care on defining the IDL should be taken. A separate set of JAVA programming language tools available with the connector can automate the process of creating the IDL to represent the EJB software objects, data structures and event processing that is mentioned below. Further details on these tools are described below along with a full example of an IDL file.

6.1 Entity Components Represented in IDL

In the exemplary system, the following entities need to be represented in the IDL to enable the connector to apply data from Vitria correctly in the Weblogic environment (EJBs, etc.).

| Entity | Description |
|---|---|
| IDL | At the top level, all business events used by the connector can neatly be organized within one top-level module. The Amdocs connection flow has a parameter that can be used to specify filtering of events/interfaces to those that belonging only to this module. The contents of this IDL module definition are:<br>1. Data types- struct definitions of data type classes used by the beans to pass information other than primitive data types<br>2. Sub-modules- used to separate and declare entities used for processing EJBs by each bean by module. These sub-modules are necessary to allow uniqueness between bean methods on different beans that have the same method name but may have different parameters or return values. The connector relies on the name of the method to do a method invocation.<br>3. Status struct- used on every event by the connector to communicate errors within the event's data body. These errors will typically capture information from exceptions thrown by the beans themselves due to data validation problems. |
| Bean | For each EJB that will be manipulated by the connector, there is a defined sub-module in IDL reserved for the bean to localize the naming of related methods, etc. This is necessary since different beans may have the same method names (i.e. store) but different parameters. Each sub-module is named the same as the class name of the home interface of its related EJB. If the connector were to support 10 deployed beans, there would be 10 sub-module definitions in the IDL. Included in the sub-module are supporting IDL struct definitions, an event interface, and all events that will use this bean. The struct definitions in the sub-module represent the bean's methods (see Method) and represent the ordering of the method invocation for each event (see Event). All events are grouped together into an event interface with the same name as the sub-module (and thus the bean home interface class name). The result is an event specification signature that looks like this: <Top Module>/<Sub-Module>/<Interface>#<Event> such as "accentureAmdocsAPILink/NewCustomerConvHome/NewCustomerConvHome#EventA...." With this signature, the connector will be able determine the bean to use by looking for its home interface in the event specification. |
| Method | Each method on the bean that will be use by the connector is represented in IDL as a "struct" defined in the sub-module for the involved bean. The members of the struct are the parameters and/or return value of the method. Parameter ordering is achieved by use in name-sorted order of these members. Typical conventions for this makeup are to use names with a reserved prefix like "p01_....", "p02_....", etc. and suffixed by the data type of the parameter (i.e. p01_int or p01_AddressInfo, etc.) The type of the member is that of the primitive or defined complex data type, single or arrayed (see Data Type). |
| Event | Events are user- defined components of the IDL that define business events to a bean (EJB). Each event has a declared name that will be implemented by Vitria as a Vitria event. Each event is declared in the event interface (see Bean) and passes two parameters: request and status. The request is named "request" and the type is a special struct defined in the bean IDL sub-module. This special struct declares methods to be called by the event and is typically named the event name suffixed with "_Data" (ex. CreateAccount event would have a struct called CreateAccount_Data). The members of the struct have a naming convention like "m01_....", "m02_....", etc. and are suffixed with the name of the method to call. The type of each member is that represented by the corresponding struct that defines the bean method (found in the bean sub-module). |
| Data Types | Data types are represented as structs in the IDL at the top-level module. These data types represent an equivalent pattern to the bean's complex data types used for parameters and return values on each bean method. Complex data types can contain other complex data types that would also be declared in the IDL. Members of these struct definitions represent the valid data members of the data type. |
| Variable | Variables are represented as data members on complex data types (structs) in IDL. These members can be of primitive type, JAVA strings (java.lang.String) and JAVA Dates (java.util.Date) and other complex data types. These members can be single instances or in an array. In pseudo text, the array is signified as "type[ ] name" and in IDL as "sequence<type> name". |

6.2 IDL "Walkthrough" Process

In the exemplary embodiment, the following process is used by the Vitria connector flow to execute a business event.

1. The incoming event contains an event specification (string common to all Vitria events) and two input data parameters "struct" and "status".

2. The event specification is usually in the format:

IDL:<TopLevelModule>/<SubModule>/<EventInterface>-;:1.0#<EventName>

The convention is that the <SubModule> and <EventInterface> are named the same as the EJB software object home interface. The connector will rely on the event interface name to resolve the home bean to obtain and the event name for the name of the incoming event.

3. The home bean is then searched in the Weblogic context provided by the server on login by the connector at start-up. The JNDI name searched is the EJB home interface name prefixed with the JNDI Binding Name Prefix flow property specified during connector configuration. If available, the connector attempts to create the EJB software object session.

4. Depending on the prefix of the event name, the connector will either process it against a dedicated plug-in (special event) or through the normal process (normal events).

5. For normal events the following process is used:
   a. Process the request input object by analysing the data members for the method invocation order. The ordering of the field cannot be guaranteed in the JAVA programming language so the connector will sort the names and parse following the following convention to obtain the bean method name to use: mXX_<method name> (such as "m02_store" for the store( ) method). The type of these data members will correspond to a Vitria sub-struct definition representing the bean method. If these members exist as a sequence, for each element in the sequence (array), the connector will repeat method invocation with the particular method data in the element. (Optional methods could be supported as a sequence of either one or zero elements.)
   b. In the case of method overloading where there are two methods with the same name but different parameters, an attempt will be made to isolate one by comparing the number of parameters with the number of member variables in the Vitria data object representing the EJB software object method. If there are still multiple EJB software object methods with the same name and same number of parameters, a match will be attempted by the simple name of the parameter class names (i.e. "String" for java.lang.String). The algorithm can only identify parameter classes by this simple name and not the full qualifying name (with package).
   c. For each method identified, the corresponding members of the data struct/class in Vitria representing the bean method are analysed for determining the required input parameters and/or expected return values to the method. The members representing the input parameters are ordered by name and follow the conventions (but are not required): pXX_<parameter type> (such as "p01_String). The return result expected is identified by the member name "return_results". If the method does not expect the method to return any value (i.e. void), there would be no member found with this name. For both parameters and/or return values the struct member type will correspond to the value type expected. Arrays are represented as IDL sequences (simple arrays).
   d. If the value type expected is not that of a Java primitive, String or Date, the connector will match the complex type to that of the representative struct object definition with the same name in the top-level module in IDL. The connector will continue matching members until, using recursion if necessary for complex data members that are also complex data members themselves. Matching of Vitria member to that of EJB software object data class member is first attempted by a get-accessory method (for return values coming from EJB software object methods) or a set-accessory method (for input method parameters). If no accessory method exists, then the connector tries to access the member itself if it is available (exists and is "public"). Failed matches will cause mapping errors. For identifying get and set accessory methods their signatures are identified for a match. This signature for accessory "get" methods is a method name prefix "get" plus the member name that accepts no parameters and returns a value. The signature for accessory "set" methods is a method name prefix "set" plus the member name that accepts only one parameter and returns nothing (i.e. void).
   e. Once all bean method parameters and/or expected return values are identified, the parameters are passed to the bean method during method invocation as a parameter array. The results are then assigned to the "return_results" as dictated previously in a copy of the event that will be pushed to the next flow.

6. For special events refer to the description of Plug-ins above.

7. The result value(s) returned from the method invocations on the EJB software object during processing of the Vitria event are assigned on a copy of the original incoming event. The output of the flow takes this copied event when the flow "pushes" the event to the next flow in the connector model (if defined) and the process is complete.

IDL Build Tools

Overview

IDL tools were built to facilitate the creation of IDL from beans available to a WebLogic client (such as Vitria). They consist of "getBeans" and "IDLBuild". "getBeans" searches a Weblogic environment for available beans while "IDLBuild" will process the list generated by "getBeans" to begin completing the picture to represent valid events in IDL for these beans. For a complete start-to-finish using these tools, the "IDLBuild" tool will be executed several times with an input file containing pseudo-script like declarations of beans, data types, methods and events. An example is given below of this pseudo-IDL script after several iterations prior to final generation of the IDL. The final IDL is shown below.

Pseudo-IDL Script Example:

```
// Generated by: (editing stage3.txt file)
OPTIONS
    DataTypePackages = amdocs.csm3g.datatypes,
    amdocs.csm3g.appservices
    JNDIBindingNamePrefix = amdocsBeans
    allowValidateMethodsOnDataTypes = false
    MODULE accentureAmdocsAPILink
    BEAN NewCustomerConvHome:amdocs.csm3g.sessions.
    implementation.NewCustomerConvBeanEOImpl_WLStub {
        METHODS
            getAddressInfo {
                RETURNS AddressInfo
            }
            getContactInfo {
                RETURNS ContactInfo
            }
            getCustomerGeneralInfo {
                RETURNS CustomerGeneralInfo
            }
            getCustomerIdInfo {
                RETURNS CustomerIdInfo
            }
            getCustomerTypeInfo {
                RETURNS CustomerTypeInfo
            }
            getNameInfo {
                RETURNS NameInfo
            }
            setAddressInfo {
                PARAMETER AddressInfo
```

-continued

```
}   setContactInfo {
        PARAMETER ContactInfo
}   setCustomerGeneralInfo {
        PARAMETER CustomerGeneralInfo
}   setCustomerTypeInfo {
        PARAMETER CustomerTypeInfo
}   setNameInfo {
        PARAMETER NameInfo
}   store {
        RETURNS int
} EVENTS
    generalCreateCustomer
    // << OPTIONAL: Edit method list below (auto-added) >>
    {
        setAddressInfo
        getAddressInfo
    }
    spec_CreateCustomer
    // << OPTIONAL: Edit variable examples below for
    special event (auto-added) >>
    {
        AddressInfo addressInfo
        ContactInfo contactInfo
        CustomerGeneralInfo customerGeneralInfo
        CustomerIdInfo customerIdInfo
        CustomerTypeInfo customerTypeInfo
        NameInfo nameInfo
    }
}
DATATYPE AddressInfo {
    int AddressId
    String AdrPrimaryLn
    String AdrPrmLineElem1
    String AdrPrmLineElem2
    String AdrPrmLineElem3
    String AdrPrmLineElem4
    String AdrPrmLineElem5
    String AdrSecLineElem1
    String AdrSecLineElem2
    String AdrSecLineElem3
    String AdrSecLineElem4
    String AdrSecLineElem5
    String AdrSecondaryLn
    Date AdrSinceDate
    String CityLine
    String CityLineElem1
    String CityLineElem2
    String CityLineElem3
    String CityLineElem4
    String CityLineElem5
}
DATATYPE ContactInfo {
    String ContactCountryCd
    String ContactFaxno
    int ContactId
    String ContactName
    String ContactRole
    String ContactTelno
    String ContactTnExtno
    String Email
    String HomeTelno
    String MobileTelno1
    String MobileTelno2
    String WorkTelno
    String WorkTnExtno
}
DATATYPE CustomerGeneralInfo {
    String AssistantId
    int LegacyCustNo
    String MarketingChannel
    Date OpenDate
}
DATATYPE CustomerIdInfo {
    int CustomerId
}
DATATYPE CustomerTypeInfo {
    byte CustomerType
}
DATATYPE NameInfo {
    byte Gender
    int NameId
    String NameLine1
    String NameLine1Elem1
    String NameLine1Elem2
    String NameLine1Elem3
    String NameLine1Elem4
    String NameLine1Elem5
    String NameLine2
    String NameLine2Elem1
    String NameLine2Elem2
    String NameLine2Elem3
    String NameLine2Elem4
    String NameLine2Elem5
}
```

This input file can be mostly generated automatically except for declaring the business events and defining the order of method invocation on the bean for these events. For this information, the tool will output to the screen the partially completed file still in pseudo-language format (as shown above) that can be redirected to a new file (such as IDLBuild example1.txt>example2.txt). Once captured, a user can edit this new file to specify the events to the beans and then process this edited file again with the utility. This process can be re-executed in an iterative approach to complete more details of how the connector will process the event to the EJB software object. Once all the data is supplied, the user can specify the "-idl" flag as a parameter to generate the final IDL output.

Command Line Usage: getBeans

The following command line executes the EJB software object search utility ("getBeans"):

java getBeans<user><password><URL:port><JDNI Name Prefix> where the user, password and URL with port number are used to log into the Weblogic environment and the JDNI Name Prefix is used to filter the environment context for EJB software objects with that directory names with that prefix. This tool will work once the system is configured correctly to run Weblogic client applications.

An example output from this process is shown below from a successful Weblogic connection finding one related EJB software object:

\\Generated by: "java getBeans system cobra1234 http:.backslash..backslash.localhost:7129 amdocsBeansa \\Connected successfully using http to localhost.backslash.127.0.0.1:7129

OPTIONS
    JNDIBindingNamePrefix=amdocsBeans
BEAN
    NewCustomerConvHome:amdocs.csm3g.sessions.implementation.NewCu-stomerConvBeanEOImpl_WLStub Command Line Usage: IDLBuild The following command line executes the IDL generation tool ("IDLBuild"):

java IDLBuild [-options]<input file> where the input file is used for processing parts of the bean/data type analysis previously done by the tool. This file is usually modified by the user beforehand and incorporates added information such as events and method invocation ordering for such events. This tool depends on having access to the CLASSPATH directories of the beans and bean data types offered by the Weblogic server. Options specified above include:

| Option | Description |
|---|---|
| -IDL | This flag indicates that the output of the tool is final (not to be used via STDOUT redirection to a file) and therefore should be in the standard IDL format used by Vitria. |
| -c[lassinfo] < full class name> | Display information on methods and members of a class (assuming the class is available from the current class path). This option can be specified as either "-c" or "-classinfo" and the class name must be fully qualified (i.e. use "java.lang.String" not "String". |
| -dateformat | This option allows a user to determine the date format used on machine running the operating system and should be executed on the machine running the Vitria BusinessWare server that uses the connector. Use of this option will allow an end user to understand the String format to use to set date fields represented in Vitria event data as Strings. Test data should be passed to the connector in this way. |
| -m[odule] < module name> | This option allows the user to override the default module name that is generated by the tool for the top-level IDL module. This option can be either specified by "-m" or "-module" and requires a string parameter valid for the module name. |
| -addbean < JNDI Binding Name : <Full Class Name for the Bean Home Interface> | This option allows the user to add an additional bean to the configuration file being parsed (new output is standard-out). Use of this option requires a JNDI binding name for lookup on the Weblogic server and the full class name of the home interface separated by a colon (":"). The tool needs both to first represent the JNDI name in IDL and second to investigate and automatically script the representation of the EJB software object without need of a Weblogic connection. This requires that the environment class path has access to both the Weblogic javax classes as well as the Jar file(s) for the deployed beans and supporting data classes. |
| -addevent < JNDI Binding Name> : < new Event Name> | This option allows the user to specify a new event to be added at the command line and requires the JNDI Binding Name of an existing bean (that is defined for the tool) and the name of the new event. The added event will be inserted and will be part of the new output (standard-out to the screen). |

Pseudo-IDL Input File Syntax

Ideally, the user should not have to manually edit the final IDL directly but instead the pseudo-IDL file. Below describes the syntax of this file format:

The file is segmented into four components: OPTIONS, MODULE, BEAN, and DATATYPE. Ordering of these reserved words are not important though their contents may be. The OPTION and MODULE section will be automatically defaulted if not specified.

The input file requires a specific syntax for the tool to process the intended bean and data type configurations correctly. The syntax consists of keywords, braces ("{" and "}") for sub-sectioning, name and value sets and other special tokens. The following syntax components are defined below by text file subsection:
  OPTIONS: hold user preferences for how the tool should behave and filter the syntax/lookup beans and data classes
  MODULE: defines the top-level module that the contents of the file will be put when output is IDL.
  BEAN: defines a bean to be represented in IDL
  DATATYPE: defines a bean data type class defined by the bean vendor (not complex Java data types).
OPTIONS:
Options are listed in the following order with examples:
DataTypePackages=amdocs.csm3g.datatypes,
    amdocs.csm3g.appservices
JNDIBindingNamePrefix=amdocsBeans
allowValidateMethodsOnDataTypes false Each option is declared as option name, "=" and a string for the parameter. The following options, if declared, are shown:

| Option | Description |
|---|---|
| DataTypePackages | This option defines the data type packages that all complex data type(s) used by the EJB software objects for method parameters and/or return values to be represented in IDL for the connector to operate. Commas (",") separate multiple class packages. |
| JNDIBindingNamePrefix | This option defines the prefix of the JNDI binding name for beans used by the connector. These prefixes are not needed when declaring each bean and this name prefix should be the same specified on the connector's flow properties. |
| AllowValidateMethodsOn-DataTypes | This Boolean option indicates if special void methods with no parameters are identified and represented on the bean complex data types. If set true, these methods will be included in the final IDL as type = "any" (Vitria data type). These methods are intended to allow for additional validation of the data objects created by client applications prior to passing them to the bean instance. The presence of these method names are allowed in IDL to indicate to the connector that they should be called prior to passing them to a bean for processing. Default is false (do not use/look for them). |

MODULE:
This top-level key word describes the module name for the top-level module to be defined in the final IDL output. The syntax is as follows:
  MODULE <top level module name>
  Where <top level module name> is a valid module name to be used in the IDL specification.
BEAN:
The bean declaration contains the following:
  JNDI Binding Name and full class name of the Home Bean separated by a colon (":").
  Subsection specified by a set of braces ("{" and "}").
The JNDI Binding name is used for specifying in the final IDL. In order for the tool to perform bean analysis for automatic IDL generation, it uses the Home bean class name to investigate. The optional subsection specified by braces is used to associate method and event definitions that the tool should create for the bean in IDL. If the subsection is not specified, the tool will attempt to look up the bean home class and complete most of this section (the user still has to specify the event or events).
In the subsection, the following key words are used:
  METHODS: declared to specify the list of methods (by name) available to be used on the bean
  EVENTS: declared to specify the list of events that will be defined that will use the bean
  such as

```
BEAN <bean name>
{
    METHODS
        ...
    EVENTS
        ...
}
```

"METHODS"

Methods need to be declared first before events since events will have definitions of which bean events in which order should be used to execute the event. The following names following this key word will be the method names that will be represented in the final IDL. If syntax for each method is as follows:

<method name><optional subsection><next method name><optional subsection>where the optional subsection is specified by a set of braces ("{" and "}"). This pattern continues until either a reserved keyword is found (which should be "EVENTS") or an end-brace for the bean definition is encountered ("}"). A series of methods are only separated by white space (space, tab, end-of-line, etc.).

If the optional subsection is not provided ("{" and "}") following a method name, the tool will attempt to complete this section. This will be done populating the appropriate method parameters and/or return value definition(s). Neither parameters nor a return value is required so that the method is valid. A void bean method with no parameters can be represented with an empty subsection ("{ }"). However the order of the parameters will be important. The following key word and token definitions are used to define this subsection:

```
...
METHODS
    <method name>{
        [PARAM[ETER]] <parameter type> ["[ ]"]
        [PARAM[ETER]] <parameter2 type>["[ ]"]
        ...
        RETURNS <return type>["[ ]"]
    }
```

PARAM or PARAMETER is optional and not required to be specified for declaring a parameter (however for the return value type, its keyword is required).

<parameter type>. The parameter type has to be defined in the same fashion as data members of complex data types (see below: DATATYPES).

"[ ]" is optional to specify this parameter is an array of the parameter type (example of a method input parameter that is a array of strings would be "PARAMETER String [ ]".

RETURNS. For declaring a return value that will be produced when invoking the bean method, the key word is required (where the parameter keyword would have be specified if it were instead an input parameter).

"EVENTS"

Following the "METHODS" declaration, Vitria events that should be associated to the bean are specified following the keyword "EVENTS". Events names are specified in the same way as the methods and contain sub-sections.

```
...
EVENTS
    <regular event name> {
        <method name>
            <method2 name>
        ...
    }
    (Or for special events- advanced use)
    <special handling event name> {
        <sub-parameter name><sub-parameter type> ["[ ]"]
        <sub-parameter2 name><sub-parameter2 type>["[ ]"]
        ...
    }
```

For special event handling, the sub-section defines not the bean methods to invoke but is a handle for sub-parameter(s) that will be passed as a special "struct" object in IDL to the specific plug-in handling the special event. The sub-parameter names, types and array ("[ ]") indicators are defined in the same way as DATATYPE members (see DATATYPES). Please refer to the section(s) in this document that discuss "Plug-Ins" or handling Special Cases for more information on this advanced use.

DATATYPE:

The data type declaration contains the following:
Data type class name
Optional subsection specified by a set of braces ("{" and "}").

The data type declaration is used to represent EJB software object data classes in Vitria. These "representative" Vitria struct definitions will share the same name as the EJB software object data type (minus the package prefix). Each data type will have data members representing the EJB software object data class members. The subsection mentioned above will list these data members as follows:

```
DATATYPE <data type class name> {
    <member type> ["[]"] <member name>
    <member2 type> ["[]"] <member2 name>
    ...
}
```

For each member, a member type and member name is required. If the member is an array of the declared member type, an array ("[ ]") indicator is placed between the type and name. When the tool generates the final IDL, the array would be represented as:

sequence<type>name.

In case a DATATYPE has a member that is a DATATYPE too, the final IDL looks like:

```
...
struct CustomerIdInfo {
    long CustomerId;
};
struct CustIdInfoExample{
    CustomerIdInfo CustomerIdInfo;
};
...
```

In this situation, trying to import the idl would produce the error:
  com.vitria.fc.meta.ResolveToWrongKindException:
    Expected a type but CustomerIdInfo refers to a variable.
  Therefore the struct CustIdInfoExample needs to be manually modified as follows:
    struct CustIdInfoExample{CustomerIdInfo customerIdInfo;};

If allowed, validation methods that may be available on an EJB software object data class can be represented. These are represented as type="void" with the full method name. In IDL, they will be represented as the Vitria defined type "any."

Example IDL for APILink Connector

```
// Generated by: "java IDLBuild stage4.txt -id1"
module accentureAmdocsAPILink {
    module NewCustomerConvHome {
        interface NewCustomerConvHome;
        interface NewCustomerConvHome {
```

```
event void generalCreateCustomer(in generalCreateCustomer__
Data request, in event__response__status status);
event void spec__CreateCustomer(in spec__
CreateCustomer__Data request, in event__response__status
status);
    };
    struct getAddressInfo {
        AddressInfo method__results;
    };
    struct getContactInfo {
        ContactInfo method__results;
    };
    struct getCustomerGeneralInfo {
        CustomerGeneralInfo method__results;
    };
    struct getCustomerIdInfo {
        CustomerIdInfo method__results;
    };
    struct getCustomerTypeInfo {
        CustomerTypeInfo method__results;
    };
    struct getNameInfo {
        NameInfo method__results;
    };
    struct setAddressInfo {
        AddressInfo p01__AddressInfo;
    };
    struct setContactInfo {
        ContactInfo p01__ContactInfo;
    };
    struct setCustomerGeneralInfo {
        CustomerGeneralInfo p01__CustomerGeneralInfo;
    };
    struct setCustomerTypeInfo {
        CustomerTypeInfo p01__CustomerTypeInfo;
    };
    struct setNameInfo {
        NameInfo p01__NameInfo;
    };
    struct store {
        long method__results;
    };
    struct generalCreateCustomer__Data {
        setAddressInfo m01__setAddressInfo;
        getAddressInfo m02__getAddressInfo;
    };
    struct spec__CreateCustomer__Data {
        AddressInfo addressInfo;
        ContactInfo contactInfo;
        CustomerGeneralInfo customerGeneralInfo;
        CustomerIdInfo customerIdInfo;
        CustomerTypeInfo customerTypeInfo;
        NameInfo nameInfo;
    };
};
struct AddressInfo {
    long AddressId;
    string AdrPrimaryLn;
    string AdrPrmLineElem1;
    string AdrPrmLineElem2;
    string AdrPrmLineElem3;
    string AdrPrmLineElem4;
    string AdrPrmLineElem5;
    string AdrSecLineElem1;
    string AdrSecLineElem2;
    string AdrSecLineElem3;
    string AdrSecLineElem4;
    string AdrSecLineElem5;
    string AdrSecondaryLn;
    string AdrSinceDate;
    string CityLine;
    string CityLineElem1;
    string CityLineElem2;
    string CityLineElem3;
    string CityLineElem4;
    string CityLineElem5;
};
struct ContactInfo {
    string ContactCountryCd;
    string ContactFaxno;
    long ContactId;
    string ContactName;
    string ContactRole;
    string ContactTelno;
    string ContactTnExtno;
    string Email;
    string HomeTelno;
    string MobileTelno1;
    string MobileTelno2;
    string WorkTelno;
    string WorkTnExtno;
};
struct CustomerGeneralInfo {
    string AssistantId;
    long LegacyCustNo;
    string MarketingChannel;
    string OpenDate;
};
struct CustomerIdInfo {
    long CustomerId;
};
struct CustomerTypeInfo {
    octet CustomerType;
};
struct NameInfo {
    octet Gender;
    long NameId;
    string NameLine1;
    string NameLine1Elem1;
    string NameLine1Elem2;
    string NameLine1Elem3;
    string NameLine1Elem4;
    string NameLine1Elem5;
    string NameLine2;
    string NameLine2Elem1;
    string NameLine2Elem2;
    string NameLine2Elem3;
    string NameLine2Elem4;
    string NameLine2Elem5;
};
struct event__response__status {
    string error__text;
    long error__code;
    octet severity;
    long error__type;
};
};
```

Connector Plug-In Template

```
/*
This file is a Template for a plugin Class to be used by the Amdocs Connector.
The following rules already provided in this template are essential for correct
development of a plugin and should not be modified...
--------------------------
    1. This class must belong to the package: com. accenture.vitria.amdocs.connector.plugins
    2. This class must import the BaseEjbPlugIn, AmdocsLogger and AmdocsConst classes of the amdocs
        connector package: com.accenture.vitria.amdocs.connector
```

-continued

3. The abstract method called "process" as defined in the class BaseEJBPlugIn must be
   implemented in the plugIn class. This method accepts the Vitria event data component
   "request" and the remote interface for the EJB, both as generic Java Objects
   (java.lang.Object). "process" throws exceptions of type "Exception".
4. The updateStatus( ) inherited from the BaseEJBPlugIn should be used to update the Status
   parameter of your event.

The following four steps are required to be performed to correctly finish the plug-in from
this template.
---------------------------
1. Rename the following strings in the code list below with the appropriate settings
      #PLUG_IN_CLASS_NAME#    the name of the this plug-in class that should be the same as the event name...
      #TOP_MODULE#    the name of the top-level module declared in IDL handling this special event
      #EJB_HOME_INTERFACE#    the name of the home interface that is used to obtain the bean
      #EJB_REMOTE_INTERFACE#    the full class name of the actual remote EJB interface/object to be used.
2. Identify all the classes from Amdocs and Vitria that you need to import as you'll be using a bean,
   creating datatypes to populate that bean, and Vitria event stub data classes used.
   (The location for this is labeled below as TODO_1)
3. Identify what your process method is going to implement and what actions it is going to perform
   on the bean and use the JavaDoc comment area to describe this process
   (This should be done in TODO_2 below)
4. In the TODO_3 section is where you should implement your process. You should use accessor methods to
   do each task of your process and then in the main code of process, around a try-catch statement
   call these methods.
   In the base plug in class (super class to this one), there is an updateStatus method that allows
   the user to manipulate the Vitria Status parameter directly. The signature is as follows:
   updateStatus(String error_text, Integer error_code, Byte severity, Integer error_type))
   (An example of this is used at the end of the code to specify a "success".) error_type == null
   indicates a successful event.
   You can also use the logger methods provided by the BaseEJBPlugIn class to log information and errors
   to Vitria's logFile. You have access to the following methods on the logger:
       logger.logError(String),
       logger.logNormal(String),
       logger.logException(Throwable, String),
       logger.logDebug(String),
       logger.logVerbose(String),
       logger.logWarning(String).
     (For more details check the detailed design documentation of AmdocsLogger class (JavaDoc))

```
*/
// START OF PLUG-IN CODE:
package com.accenture.vitria.amdocs.connector.plugins;
import com.accenture.vitria.amdocs.connector.BaseEjbPlugIn;
import com.accenture.vitria.amdocs.connector.AmdocsLogger;
import com.accenture.vitria.amdocs.connector.AmdocsConst;
        // import the data classes for the top-level class
import #TOP_MODULE#.#EJB_HOME_INTERFACE#.#PLUG_IN_CLASS_NAME#_Data;
        // import the status struct definition (assumed name)
import #TOP_MODULE#.event_response_status;
        // import the class defn. of the EJB remote instance
import #EJB_REMOTE_INTERFACE#;
//... add your additional Vitria event data classes and EJB data classes here...
//
//#TODO_1:   ADD ALL VITRIA RELATED TO THE IDL STUBS USED BY THIS SPECIAL EVENT AND
//           AMDOCS IMPORTS FOR DATA CLASSES THAT YOU WOULD NEED FOR IMPLEMENTING YOUR PLUGIN CLASS
// As an example this is what you could do:
     // Vitria IDL data class stubs used by special Vitria event
//import AmdocsBeans.NameInfo;
//import AmdocsBeans.CustomerGeneralInfo;
//import AmdocsBeans.CustomerTypeInfo;
     // Amdocs EJB data types and exceptions (such as used in an Amdocs Java client
//import amdocs.csm3g.exceptions.*;
//import amdocs.csm3g.datatypes.*;
/**
 * This Plug-In class is a template for all plugIns to be used in Amdocs Connector.
 * //#TODO_2: PUT HERE COMMENTS TO YOUR CLASS
 *
 * @author Accenture
 * @since 05 June 2001
 */
public class #PLUG_IN_CLASS_NAME#
extends BaseEjbPlugIn {
    /**
     * This method is the required signature for the implementation
     *
     * @param request holds the request data that you want to manipulate
     * @param The bean object, that represents the bean you wish to use
     * @return An object of the same type that came in but maybe modified with new data
     * @exception An exception for the flow to handle error that you are not able to handel, mainly related to
system failures
     *
```

```
      * @since 05 June 2001
      */
     public Object process( Object request,
             Object beanObj)
             throws Exception{
         // Declaring the "bean" variable as the EJB remote interface and casting the generic
         // beanObj passed in as this remote interface to have direct access to the EJB methods
         // directly in the code. From this point forward, you should be able to simply manipulate
         // the EJB by using the variable name "bean". (Example: bean.store( ), bean.getAddressInfo( )...
         //
         #EJB_REMOTE_INTERFACE# bean = null;
         if(beanObj instanceof #EJB_REMOTE_INTERFACE#) {
           bean = (#EJB_REMOTE_INTERFACE#)beanObj;
         }
         // Declaring the "data" variable as the Vitria event body date that is the request parameter
         // of the event to the Vitria stub generated for this event. From this point forward, you
         // be able to simply access and modify the Vitria data by using the variable name "data".
         // (Example: data.FirstName or data.return_results, etc... assuming they are declared in IDL)
         //
         #TOP_MODULE#.#EJB_HOME_INTERFACE#.#PLUG_IN_CLASS_NAME#_Data data = null;
         if(request instanceof #TOP_MODULE#.#EJB_HOME_INTERFACE#.#PLUG_IN_CLASS_NAME#_Data) {
           data = (#TOP_MODULE#.#EJB_HOME_INTERFACE#.#PLUG_IN_CLASS_NAME#Data)request;
         }
//
//       #TODO_3: IMPLEMENT THE CODE TO BE USED BY THE process METHOD for accessing the EJB
//           (Remember to use try-catch statements if you want to handle specific remote
//           remote EJB exceptions specifically. To intentionally throw an exception
//           explicitly in your code, throw a "new Exception". Exceptions will be handled
//           by this connector in a manner consistent with the general event handling
//           processes.
//
//       Example code could look like...:
//       try{
//          setSomething(data);
//          storeData( );
//          logger.logVerbose("Process finished correctly");
//       }
//       catch(Exception e){
//          updateStatus(error_text, error_code, severity, error_type);
//          logger.logError("Caught exception will setting customer type");
//          throw e;
//       }
//
         // Update the status request object with success if no errors occur.
         updateStatus("Success", new Integer(0), new Byte((byte)'I'), null);
         // DO NOT REMOVE. The following statement allows event data updates to be passed back
         // to the main flow body for continued processing in the connector model. Not executing
         // the statement below will prevent this special event from gathering return information
         // from the manipulated EJB.
         return (Object)data;
       } // END OF PROCESS METHOD
     } // END OF CLASS
```

Troubleshooting in the Exemplary Embodiment

The following symptoms and suggested troubleshooting tips are used in the exemplary Vitria-Amdocs architecture. In preparing a specific connector for another similar system, the implementer will likely need to specify specific troubleshooting tips in addition or in place of the following.

| SYMPTOM | CORRECTIVE ACTION |
|---|---|
| Connection model does not start (yellow indicator). | Make sure all the following points are verified: EXTRA classpath includes Weblogic Classes. User, password and URL are correctly defined in the flow properties. If http is the protocol used to connect to the server make sure the line weblogic.httpd.tunnelingenable d = true is specified in the weblogic.properties file. |
| Java.lang.ClassCastException while invoking a method. Connection to the server is through http. | EXTRA classpath does not contain jar file for WL Service Pack 10 (weblogic510sp10.jar) |
| Java.lang.ClassCastException while attempting to create an instance of a Bean remote interface. Connection to the server is through t3. | EXTRA classpath does not contain jar file for WL Service Pack 10 (weblogic510sp10.jar) |
| Connection model stops when sending an event through. Log message is: Bean not defined in Weblogic Server, cannot process event. | Field "JNDI Binding Name Prefix" in flow properties could be misspelled |

7. Design

7.1 Vitria Framework Implementation

Figure 10:
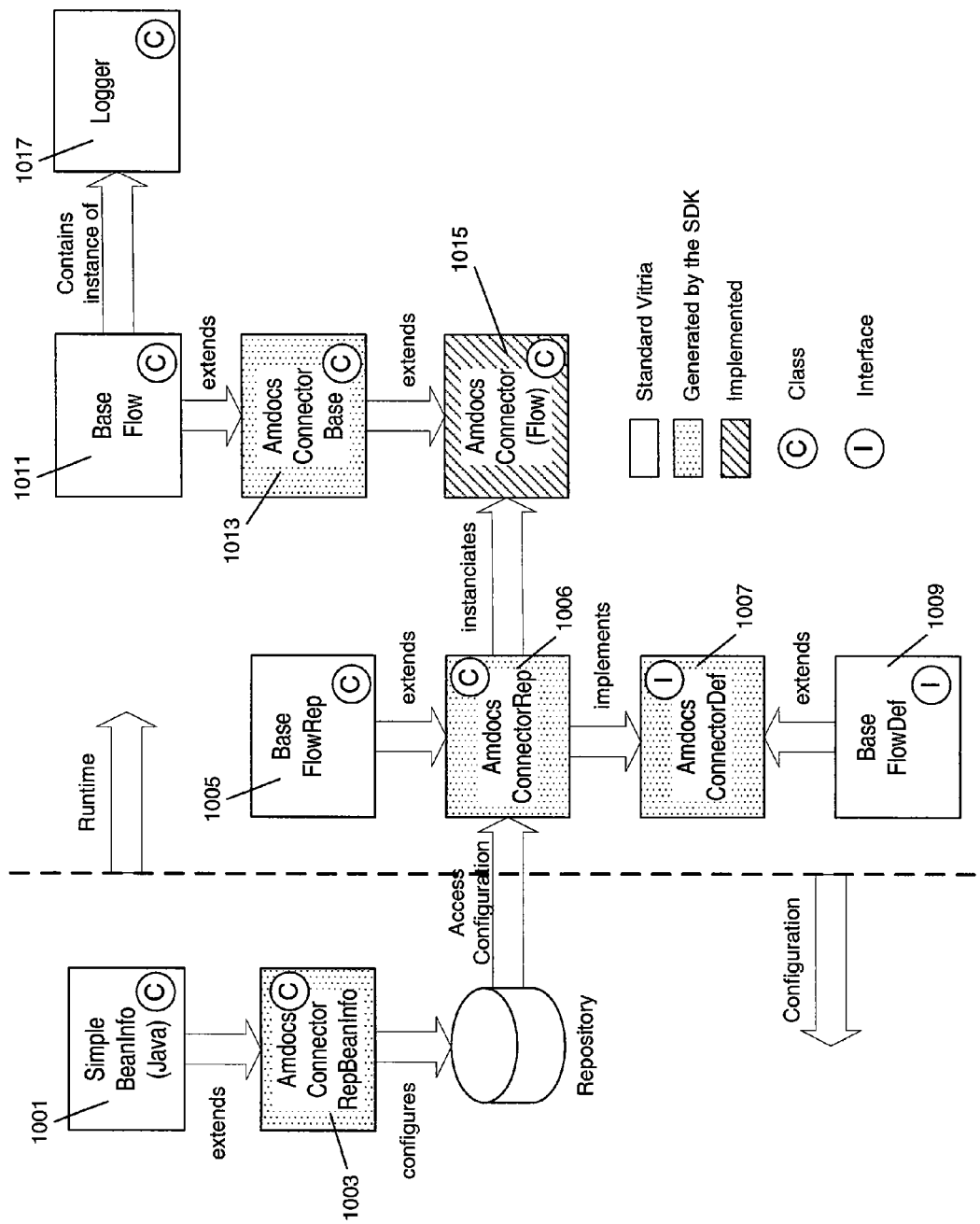
FIG. 10 depicts an Amdocs Connector Class Diagram.

In the exemplary embodiment, building a new Vitria target-source flow entails building the classes or interfaces represented in FIG. 10 that are the building blocks of the Connector and must be implemented. The classes 1001, 1005, 1011 and 1017, and the Base FlowDef interface 1009 are Vitria defined classes that the connector implementation must extend. A more detail description of these classes is made below in the section titled "Basic Connector Classes". All other classes (1003, 1006, 1007, 1013 and 1015) are created for the connector. The Vitria SDK wizard generates some files automatically (labelled as "generated") (1003, 1006, 1007, and 1013). The AmdocsConnector Flow implementation 1006 is built from

7.1.1 Basic Connector Classes

In this section we describe the Basic Vitria Classes and Interfaces that compose a Vitria connector. The APILink connector must extend these classes.

BaseFlowDef 1009

A connector definition defined as a JAVA programming language interface, lists the user configurable properties for the connector (i.e. any information for a user to enter before the connection model is started). It also defines the signature of setter and getter methods for these properties to be implemented by the FlowRep 1005.

This interface 1009 is the common interface for all Flow definitions of any connector. It treats the logLevel property common to all flows and deals with the bad event routing. The AmdocsConnectorDef 1007 must extend this interface (See section "Amdocs Connector Classes" below for more details).

BaseFlowRep 1005

The connector representation class implements the definition interface. Its primary responsibilities is handling and storing its listed properties and instantiating the corresponding flow implementation object when the connector model is started. This class is the base Rep for all Vitria connectors and implements the BaseFlowDef 1009. The AmdocsConnectorRep 1006 must extend this class (See section "Amdocs Connector Classes" below for more details).

SimpleBeanInfo 1001

The flow's property sheet bean defines and displays information such as property names and descriptions and is responsible for the configuration of the flow. To a large extent, the purpose of the flow definitions, flow representations, and BeanInfo 1001 objects are to enable a human user to configure a flow. These objects are not involved in the processing of flow data and are only involved in the configuration of the Flow's properties. By using the SimpleBeanInfo 1001 the basic properties defined in Flow Def 1009 are configured and saved in Vitria's repository using the connector's tag, defined in FlowRep 1005, to link this data to the correct connector.

Base Flow 1011

The processing of flow data is the sole domain of the flow implementation class. It's in the flow that all of the work of connecting to the external system and sending and receiving information (events) is accomplished.

The following is the expected behaviour for the Flow and its interaction with the FlowRep 1005 and Vitria Flow Manager, which is the object instance that controls all flows in a Vitria Connection Model:

a) The FlowRep 1005 creates the flow at the Connection Model startup
b) The FlowRep 1005 calls the Flow's 1015 init() method
c) The Vitria FlowManager calls startEvents() on the flow at the Connection Model startup
d) The Flow 1015 connects to the external system in startEvents()
e) The Flow 1015 handles events and data transfer with its external system, using the Transaction resource to commit or abort transactions with the external system if it participates in transactions.
f) The Flow 1015 disconnects from the external system at the Connection Model shutdown The Base Flow 1011 is simply responsible to guarantee that all the necessary methods are implemented by the child class, in this case the AmdocsConnectorBase 1013 and Amdocs Connector 1015, that will extend this class, and that the method signatures are correctly enforced.

7.1.2 Amdocs Connector Classes

The following classes are needed to create the Amdocs Connector 1015. These files can be automatically generated by the Connector Wizard tool provided by Vitria's SDK if one defines a specific file with the parameters needed (see section "Wizard Files" below for the file name) or they can be implemented from scratch following the correct Vitria interfaces. As these classes mainly deal with the flow properties the tool easily generates them.

All the files below are automatically generated except for AmdocsConnector 1015 that contains the connector logic where all the work of processing the events is done.

AmdocsConnectorDef 1007

The AmdocsConnectorDef 1007 is a JAVA programming language interface that extends the BaseFlowDef 1009. It lists the entire user configurable properties defined for the Amdocs connector 1015. These Properties and their description can be seen in the table of section on "Flow Properties" below. It sets out the signature of each property setter and getter methods that will be implemented by the AmdocConnectorRep 1006.

AmdocsConnectorRep 1006

The AmdocsConnectorRep 1006 extends the Base Representation class BaseFlowRep 1005 and implements all accessory methods for the Amdocs Connector properties. When the AmdocsConnectorRep 1006 is instantiated by the FlowManager, it reads all the properties saved in the repository and saves each of them in its correct member. It is the responsibility of this class to handle the flow's properties.

The FlowManager must also call a method on this class to save the properties held by the AmdocsConnectorRepBeanInfo 1003.

It is also the responsibility of this class to create the AmdocsConnector class 1015 when a Connection Model with this flow is started.

AmdocsConnectorRepBeanInfo 1003

The AmdocsConnectorRepBeanInfo 1003 class extends the SimpleBeanInfo 1001. Its responsibility is defining and displaying the Amdocs Connector properties. By using the Amdocs Connector Flow's property sheet you're actually manipulating this Bean Class that will interact with Amdocs ConnectorRep 1006 and save the properties defined in Vitria's repository.

AmdocsConnectorBase 1013

The AmdocsConnectorBase 1013 is a simple class that gets the flow's properties that will be provided to the AmdocsConnector 1015 class from the AmdocsConnectorRep 1006. As AmdocsConnector 1015 will extend the AmdocsConnectorBase 1013 we can then implement AmdocsConnector 1015 without knowledge of the calls to the AmdocsConnectorRep 1006.

AmdocsConnector 1015

This is the main class of the Connector. It is in this class that all Amdocs APILink Events are treated. This class is responsible to connect to the Weblogic Server and sending and receiving events to the APILink. It's also in this class, as one will see in the next section, that the correct handling of events received are decided, the logging is initiated and the connection with the Weblogic Server and it's deployed beans is maintained.

7.1.3 Amdocs Connector Flow

The AmdocsConnector 1015 class is the implementation class of the Vitria Flow. This class is responsible for connections to the external system one wishes to communicate with (Amdocs APILink) and of processing all events received from the connection model that interacts with the External System.

Figure 11:
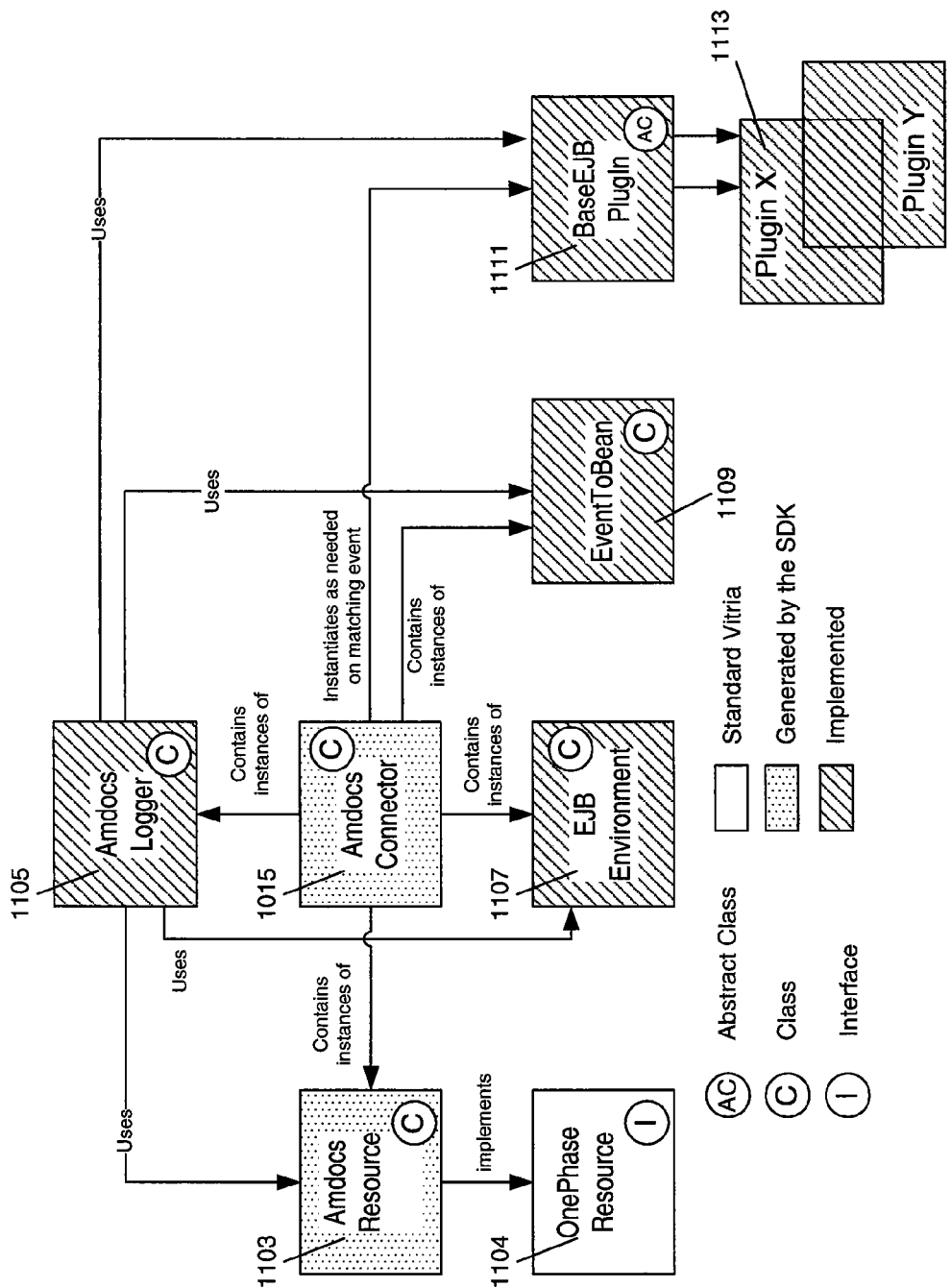
FIG. 11 depicts an Amdocs Connector Flow Class Diagram.

FIG. 11 shows the relationship of the AmdocsConnector class 1015 with other specific classes implemented in the Connector.

The Amdocs Connector is designed to be reusable, flexible and modular. Each object defined separates dependencies of various application environments (Weblogic, Vitria, etc.) wherever possible. Based on this premise the AmdocsConnector class 1015 integrates these other objects together and controls their interaction.

The AmdocsConnector class 1015 in FIG. 11 contains five modular classes with dedicated functionality.

AmdocsResource 1103

As the AmdocsConnector participates in transaction it must have a transaction resource. The AmdocsResource class 1103 is this transaction resource. It handles the calls to the appropriate methods to handle transaction with the external system. It also implements Vitria's One-Phase Transaction Resource Interface 1104.

In section on "Amdocs Transaction Resource" below more details of this class will be given.

AmdocsLogger 1105

This class is responsible for logging all the informational and error messages of the connector. It uses the Vitria Logger object provided by the Amdocs Connector Flow 1015 and the Error, Messaging and Tracing (EMT) framework API [described in section 7.1.6 and para 1205 below describes it's implementation] to create and log messages to the Error Model. After the flow creates this object during runtime, all the other classes to log their own messages use it. This class allows other participating generic classes to use Vitria's logger facilities without using any of Vitria's API.

In section on "Amdocs Logger" and on "Logging & Messaging Framework" below more details are given on this class.

EJBEnvironment 1107

This class is responsible for all the interactions between the flow and the external system such as the Amdocs APILink. No call is actually made to Weblogic server from the Amdocs flow directly. It is used to open and close a connection with the Weblogic server, to identify the EJB software object deployed in the server, and to create and remove running instance of these EJB software object for use by the Flow.

In section on "EJB software object Environment" below more details are given on this class.

Event Processing Classes

All the previous classes dealt with the Vitria or APILink environment. The following are related to the main purpose of the Amdocs Connector Flow 1015, which is processing the events received by transmitting or receiving information from the External System.

EventToBean 1109

This class is responsible for the default processing of the Amdocs Events. This class will use the JAVA programming language Reflection API to parse the incoming event data object and invoke the correct methods on the EJB software object in the pre-defined order specified in this object. It parses through the Vitria event data object, attempting to match the fields and sub-fields against the EJB software object methods, their parameters and return values.

It will create dynamically all the parameters needed for making the method invocation (as defined in the structure of the IDL of the event) and then it will invoke the EJB software object methods, retrieve its results and create the Vitria structures on the Event data object that will hold the results.

For more details on how this class maps the Event object to the EJB software object calls please see section 7.4 "Event to Application EJB software object Processing" below.

This class also catches all business level exceptions (such like Validation or Invalid Date errors) and wraps them in a special defined exception called BeanUnhappyException that will be treated at the flow level or in the error model. All other failures related to mapping/parsing errors are wrapped in MappingFailureException and the unexpected internal errors are wrapped in a SystemFailureException.

For details on how the Connector handles Business, Mapping or System failure please see section on "Exception Handling" below and as somewhat described above.

BaseEJBPlugIn 1111 and Plug-Ins 1113

There may be situations when using the default processing is not convenient, efficient or possible to use. It is given to the Vitria developer the possibility to create custom plug-ins that will process only one type of event. Each plug-in class extends the BaseEJBPlugIn class 1111 for obtaining basic processing functionalities and to conform to a specific method signature, allowing this way, the plug-in to be called by the Amdocs Flow.

"Plug-Ins" 1113 were described above and more details about the Plug-In classes are given below.

The AmdocsConnector class 1015 has an expected behaviour to Vitria and it must implement the following methods to conform to the BaseFlow signature.

init( )

The init method is called during the initialisation of a runtime instance of the flow. This method is responsible for initialising the flow. The AmdocsConnector init method will then create an AmdocsResource object 1103 and set the duplicates field, which is the property "Rollback events being processed during machine failure on start-up" defined in the Flow Properties (See 615 in FIG. 6), and pass this object to the Transaction Service. It will also create the AmdocsLogger object 1105 to provide the flow with the logging facilities.

startEvents( )

This method is called when the connection model is started. It is responsible to create the connection to the external system we wish to connect and prepare the flow to receive events. In startEvents the EJBEnvironment object is created. This opens a connection to APILink and retrieves information about all the beans deployed in Weblogic Server. An instance of class EventToBean 1109 is also created so that everything is prepared for receiving events.

doPush( )

The doPush method is responsible for processing all the events received by the Flow. This method is called by the FlowManager to process the incoming events of the Amdocs Flow.

The implementation of this method does the following:

1. The Vitria event spec of the incoming event is analysed for retrieving the event name and bean name associated to this event (the module name of the events accepted for processing are defined by a flow property (as described above).

2. We use the EJBEnvironment 1107 to obtain an instance if the bean from the Weblogic Server that matches the bean name specified in the event spec.
3. The event is processed by EventToBean object 1109 or by a Custom plug-in according to the event name and a new event is created during this process.
4. We remove the instance of the bean that we used from the Weblogic Server.
5. The new event is pushed to the next flow of the connection model.

stopEvents( )

This method is called when the connection model is paused or stopped. It is responsible to close the connection to the external system. This is achieved by calling a method in the EJBEnvironment object 1107 that closes the session with the Weblogic server.

7.1.4 Amdocs Logger 1105

As said in the previous section where the Flow is described, this Class is responsible for logging all the informational and error messages.

Figure 12:
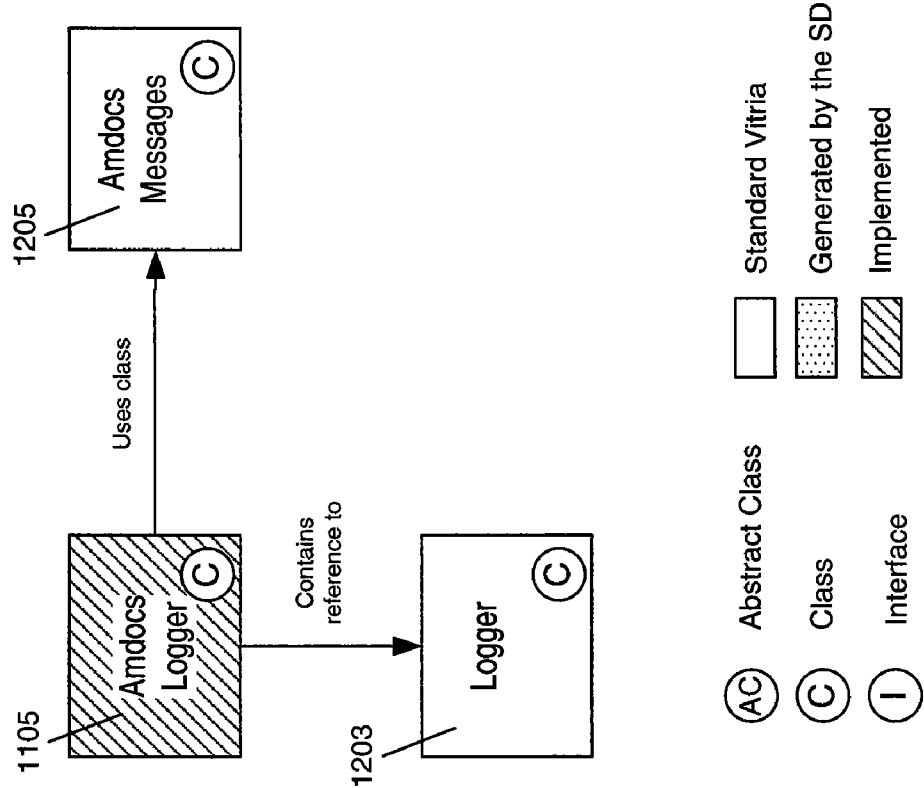
FIG. 12 depicts an Amdocs Logger Class Diagram.

In FIG. 12 the class diagram of AmdocsLogger 1105 can be seen.

This class contains a reference to the Vitria Logger 1203 that is passed in by the Amdocs Connector flow during its initialisation. It also receives the logLevel property, (See "Flow properties" for more details) defined during the configuration of the flow. It's according to the logLevel that the AmdocsLogger 1105 sends or not the correct messages to the EventLogger flow in the Error Model.

The EventLogger flow accepts as event interfaces the Diag EventsInterface or the LoggerEventsInterface. The Amdocs-Logger uses the DiagEventsInterface to send all messages to the EventLogger (See Logging & Messaging Framework below for more details).

To create and send the Diagnostic or DiagError events that are accepted by the EventLogger flow, the AmdocsMessages class 1205 is used. This class is the messaging API defined by the Error, Messaging & Tracing Framework implemented. More details on this framework are shown below.

By using this class, simple methods (that receive our message and other relevant information) can be used to construct the Diagnostic or DiagError event. This event is then sent, using Vitria's Logger API, to the EventLogger flow that will then take the relevant steps to process the event.

The Error Model can also be modified to treat these events accordingly to different methods that the Amdocs Connection Model developer must implement.

The following table shows the relationship between Vitria's LogLevel and the AmdocsLogger methods to call. If the Flow's logLevel is lower than the one specified in this table the method would not create and send the message.

| Methods | Log Level |
| --- | --- |
| LogError | 1 - Log major, serious errors |
| LogException | 1 - Log major, serious errors |
| LogWarning | 2 - Log warnings |
| LogNormal | 3 - Log major normal occurrences |
| LogVerbose | 4 - Log all occurrences |
| LogDebug | 5 - Log full detail of occurrences |
| LogObject | 5 - Log full detail of occurrences |
| LogFieldNames | 5 - Log full detail of occurrences |
| LogMethodNames | 5 - Log full detail of occurrences |

Flexibility

As seen in "Amdocs Connector Flow" above, all the classes implemented use the AmdocsLogger 1105. This class is intended to provide all the logging facilities to the Connector classes by wrapping all Vitria's Logger API and turning the logging in other class independent from Vitria.

This object when used in the Vitria Environment logs messages, errors and exceptions to the Logger object that will then forward these messages to the EventLogger flow in the Error Model.

But this object can also be used outside the Vitria Environment. The AmdocsLogger class 1105 provides a constructor method that does not need the Vitria Logger or logLevel. When this object is created with this constructor all the messages are sent to Standard out. This is very useful for testing or for tools purposes.

By using the AmdocsLogger constructed in this way we can test the EventToBean 1109 in FIG. 11 or the EJBEnvironment 1107 classes outside the Vitria environment or even use these classes in other tools without having to change the logging code.

7.1.5 Amdocs Transaction Resource

Every connector that participates in transactions requires a transaction resource that handles the calls to the appropriate methods to handle transactions in the external system. The implementation of this transaction resource in the exemplary embodiment is class AmdocsResource 1103 in FIG. 11.

When Vitria or other Flows need to commit or abort a transaction, it sends a request to the Transaction Service, which serves the whole connection model. The Transaction Service does not have the functionality to implement transactions in the external system. Instead, it relies on the transaction resources of each flow in the connection model to execute the necessary methods when needed. These methods must call the appropriate methods in the external system's API to commit or abort.

The AmdocsResource class 1103 implements Vitria's OnePhaseTransaction Interface. This enables the Amdocs Connector to participate in One Phase Transactions.

A more careful discussion of the limitations of the Amdocs Resource implementation, due to limitations of Amdocs APILink in the exemplary embodiment is done in section "Transactionality" below.

The AmdocsResource implements the four required methods as defined in the Vitria's OnePhaseTransaction Interface.

prepareToCommit( )

This method returns a transaction id that is then used by the commit resource method. As the Amdocs APILink doesn't have a transaction id, we use a DATETIME stamp as a transaction id.

commitResource( )

Due to APILink's Transaction limitations (see below) this method always returns success. It cannot fully participate in Amdocs APILink transactions because we always default that the transaction is successful.

abortResource( )

If the Transaction Service calls the abort resource method, and as we don't have any way to rollback a transaction in APILink, this method logs the processed event to the Error Logger. In the Error Model actions must be taken to guarantee that APILink successfully handles the event.

getPreparedStatus( )

As we cannot have information from APILink regarding the last transaction, there is a property called "Rollback events being processed during machine failure on start-up" (615 in FIG. 6) defined in the Flow properties where you can define the behaviour of this method. if this property is set to true the status returned is PREPARED. This means that in case there is a system fail over during an event processing, on start-up, the previous event will be re-processed. If the property is set to false the status returned is COMMITTED and you will guarantee that the event's processing is not duplicated.

Logging & Messaging Framework

Vitria BW 3.1 provides an Error, Messaging, and Tracing Framework (EMT) framework (Please refer to Vitria document Connector Programming Guide, which is hereby incorporated fully herein by reference, for more details), that is a messaging infrastructure that facilitates the delivery of portable and easy to localize code.

This framework is used by Amdocs Logger 1105 to log messages, using Vitria's Diagnostic interface.

7.1.6 Amdocs Connector's Error, Messaging & Tracing Framework

As said previously, the EMT Framework is Vitria's Messaging Framework that enables the localization of code. Implementing the EMT Framework involved creating a resource file, AmdocsRes.txt, (Please see section on "Wizard Files" below) that is a simple text file that contains all the text strings for the system, and then compiling the file using a special utility program called rescomp, or "resource compiler". The resource compiler generates several other files that can be then compiled and linked with several other Vitria classes, producing the shared library file vtAmdocsLocale3_o2r.dll (in NT) or libvtAmdocsLocale3_o2r.so (in Solaris) called a "locale bundle." This locale bundle essentially comprises a messaging API, called AmdocsMessages 1205 to which we can embed calls in our connector code.

The Amdocs Resource File developed is a simple and flexible Framework. To simplify the development process only general messages and errors are logged in the exemplary embodiment. In alternative embodiments these messages can be extended and more detailed as needed.

| Message Name | Category | Message Description |
| --- | --- | --- |
| GenericError | ERROR | ERROR: "the message to log" |
| GenericErrorWithNumb | ERROR | ERROR, code: "the error code"; severity: "the severity of the error"; msg: "the error message" |
| GenericException | EXCEPTION | EXCEPTION CAUGHT: "The exception message" |
| GenericWarning | WARNING | WARNING: "the warning message" |
| GenericNormal | TRACE | MSG: "the message to log" |
| GenericDebug | TRACE | DEBUG: "the debug information to log" |

7.1.7 Amdocs Logger and the Amdocs EMT

As seen in above, the Amdocs Logger class 1105 uses the AmdocsMessages classes 1205 that is the messaging API for the locale defined, and the Vitria Logger to send Diagnostic and DiagError events to the Error Model. The Diagnostic messages will be logged to the log File defined in the EventLogger Flow and the DiagError can be dealt with by a user defined Error Connection Model.

7.2 Exception Handling

All the exceptions thrown by the Amdocs Connector classes 1015 are one of the following 3 types. These exceptions wrap up all other kinds of exceptions that can be thrown during the event processing. This is done to classify clearly the type of errors and to easily identify the type of error the exception has originated from (as already described in some detail above).

7.2.1 SystemFailureException

This exception wraps all exceptions that are due to unexpected internal errors of the connector or to Weblogic environment problems like connection failure, bad user name or password.

This failure will stop the connection model as their origin in not correctly identifiable and doesn't allow the flow to continue correctly and will rollback the current transaction if possible.

7.2.2 MappingFailureException

This exception wraps all exceptions that are due to unexpected failures during the event processing. They represent mainly Event-EJB mismatches, data type mismatches, unavailability of a desired EJB software object, or mismatch errors that may arise from typos in Vitria's IDL creation.

These failures should only be happening in an initial phase of the development of the connector, as we suppose that the system in production has fully been tested for them not to happen.

The handling of this exception at the level of the Flow is based on the parameter ("Send data mapping errors to connector error model") defined in the Flow properties 611 in FIG. 6. This flag will indicate if these errors should be sent to the Error Model, causing, according to error model rules, the abortion or not of the connection model.

7.2.3 BeanUnhappyException

This exception is the more complex and deals with all the errors that are thrown from invoking the EJB software object or the Amdocs Data types. When manipulating data on the Amdocs APILink during event processing, these objects indicating invalid data or operation can throw exceptions. These are the exceptions that are wrapped in a BeanUnhappyException. Unlike the other two Amdocs Connector exceptions, this exception saves the original exception thrown by the EJB software object in one of its fields.

As these errors indicate a failure at the application level, there are successful from the connector perspective. The connection model should handle these events in a different manner, probably in an automatic way.

These exceptions are then handled in the Amdocs Connector flow, so that the status parameter of all events is populated with the correct error message and code. This exception will be handled based on a parameter in the flow properties. This property, as in the case of a MappingFailureException, allows the Vitria user to configure where an event that generated this exception is handled.

7.3 EJB Software Object Environment

The EJBEnvironment class 1107 handles all interactions with the Weblogic environment (i.e. the Amdocs' EJB software object Container). This class is responsible for opening a connection to the Weblogic server, identifying all the beans deployed in the EJB software object container and obtain references to them.

This class provides methods to open and close a session with Weblogic server and provides methods to control the life cycle of the bean's remote interface object: create and remove. It also logs relevant information about the number and which beans are currently deployed and accessible by the Vitria user.

The connection to the Weblogic Server is done in the startEvents phase of the flow. In the user configurable properties of the flow, all the necessary information to connect to Weblogic will be inserted by the connection model designer. These properties are "URL", "User" and "Password" (603, 605 and 607 in FIG. 6). These properties will then be used by the startEvents method of the flow to initialise the connection to the external application.

In the stopEvents method the flow closes correctly the session with the Weblogic Container by using the stopSession method in the EJBEnvironment class.

7.3.1 Code Reusability

As the class EJBEnvironment has no knowledge of the Vitria Environment it is possible to use it outside this environment to connect to the APILink Weblogic Environment.

This is quite useful as it gives one the possibility to use this class for other goals, for example, small utility tools were created to check the deployed EJB software object in the APILink environment (getbeans) or test EJB software object clients and can be created to verify if all the bean calls are working properly. By using the EJBEnvironment the opening and closing of the connection can be shifted to the EJBEnvironment object.

Another advantage of not handling the EJBEnvironment inside the flow is that one can modularise its tests and perform them without using the Vitria Environment.

7.4 Event to Application EJB Software Object Processing

This section outlines in more detail the two processes that implement the processing of the events received by the AmdocsConnector Flow.

7.4.1 General Mapping

The default mapping/processing of the Amdocs Events is performed in the EventToBean class 1109. This class uses the JAVA programming language Reflection API to introspect the Vitria event data object. By using this API one can construct new class instances and new arrays, access and modify fields of objects, invoke methods on objects and access and modify elements of arrays based on the object's run-time class. This enables one to implement the EventToBean class to be used by different Vitria and Amdocs objects.

The EventToBean 1109 will parse the incoming event data object and invoke the correct methods on the EJB software object in the pre-defined order specified in this object. It parses through the Vitria event data object, attempting to match the fields and sub-fields against the EJB software object methods, their parameters and return values.

In the exemplary embodiment, all of this process is done in four steps.

1. In the first step, the incoming Vitria object that is the "request" parameter of the Event received in the connector is introspected. This object has a list of structures that represent each one a method to call on the EJB software object. Each of these structures is mapped with the methods on the EJB software object. This is done in the method processEvent.
2. On the second step each structure that represents a method is introspected. Each EJB software object method may have parameters and return results. We introspect the EJB software object method parameters to identify that Amdocs data types are used by the method and match this with the list of structures in the Vitria method object that represents the parameter. For each parameter we use the doBeanDataObject method that will introspect the Vitria structure and create the correct EJB software object data type.
3. The third step is actually invoking the bean method with the parameters created. This is done in method doBeanMethod. This method invocation may or not return results. If results are returned we complete the fourth step.
4. The fourth step involves the creation of the Vitria structure that will hold the return values of the method call. The Vitria structure that will hold these values is in the method object and has always the name "method_results". We will then use the method doEventDataObject that will introspect the EJB software object data type result object and transform it into a Vitria object.

All the exceptions caught in this class are of 3 types and will be wrapped in one of these 3 exceptions: BeanUnhappyException, SystemFailureException and MappingFailureException. All the business level exceptions (such like Validation or Invalid Date errors) are wrapped in a BeanUnhappyException, the failures related to mapping/parsing errors are warped in MappingFailureException and the unexpected internal errors are wrapped in a System FailureException.

As Vitria doesn't allow for null references in its objects, the behaviour of the class can be customized by user defined properties to allow null values to be passed to the Bean Data types and to represent null values in the Vitria Data objects. The first property allows String values to be passed as null (property "Strings Values Can Be Passed as Null To Bean"). If this property is set to true all strings that are equal to the property "String value for null" will be set to null during the Amdocs Data type creation. The other two properties related to the creation of the Amdocs Data type are "Allow to specify optional complex", that allow to set null to Amdocs Data types that are contained in other Data types and "No Date pass null to bean" that specifies if it is possible to pass null to Date object in the Amdocs Data types in case the sting that represents them in Vitria is empty.

The last property ("Accept values that are null from Bean") indicates if the EventToBean class should accept Amdocs Data types with null members as a result to the method invocation. If set to true, the default values of the members in the Vitria object are: Strings are empty, Strings representing Date are empty and the structures representing Amdocs Data types are initialised with default values.

More detail on these properties was described above.

Plug-Ins

It is given to the Vitria developer the possibility to create custom plug-ins that allows the user to build extensions to the AmdocsConnector for special-treatment of handling an EJB software object.

Each plug-in class extends the BaseEJBPlugIn class for obtaining basic processing functionalities, like logging, and to conform to a specific method signature, allowing this way, the plug-in to be called by the Amdocs Flow.

The BaseEJBPlugIn class is an abstract class with several utility methods implemented and one abstract method. Each Plug-In class must extend this class and implement the abstract method.

This method is called process. This is the method that will be invoked by the AmdocsConnector class 1015 in FIGS. 10 & 11, in case a special event is received that should be processed by a plug in.

The implementation of this method will directly manipulate the bean and the event "request" object. These objects can be cast to their correct class and be dealt as simple known classes. The implementation should then use the event object data to call the bean methods one wishes and the event "request" object should be updated with return data from the method calls.

This object must be returned at the end of the process method because the output event of the Flow will be created with this object.

All exceptions caught during the processing of the plug-in event can be thrown, but they should be treated inside the plug-in. If an exception is thrown from the process method it will be wrapped in a SystemFailureException in the Amdocs Flow and will cause the connection model to stop.

Implementation of plug-ins is described above.

7.4.2 Handling Amdocs API Exceptions

As described above, the application related exceptions are always wrapped in a BeanUnhappyException. The Amdocs exceptions may contain an error code, error text and severity code that are handled at the Flow level by the method treatBeanUnhappyException( ).

7.5 Transactional Behaviour

Each connection model has a Transaction Service that handles transactions across all flows in the connection model. When the connection model is started, each flow that participates in the transaction creates an object called a Transaction Resource and passes it to the Transaction Service. When the Transaction Service needs to commit or abort a transaction for the connection model, it calls the appropriate methods in each flow's transaction resource. The Transaction Service is needed because each individual flow is written as a reusable component and is not written to be aware of all the other flows in the connection model.

So every connector flow that participates in transactions must have a Transaction Resource and the Transaction Service relies on these to call the appropriate methods in the external system's API to commit or abort.

7.5.1 Limits to this Approach in the Exemplary Embodiment

Amdocs APILink does not implement a form of transaction control.

Although in other EJB software object transactions that have persistence the boundary of an EJB software object call begins with the create method of the EJB software object and ends with the store method, APILink doesn't follow these conventions. The transaction boundary for an EJB software object call to Amdocs APILink extends from the Ensemble database(s) to Tuxedo/Weblogic only.

This is a limitation that cannot be addressed at the connector level and can only be solved at the application system (in this case Weblogic) level since it is fundamental to the Tuxedo database transaction process. Fundamental architecture changes are required by Amdocs to effectively address this issue. Potential problems that could arise is the failure during the process of creating an entity, between the store/commit and then calling methods to get the results. If this occurs, the key could be unknown and thus may require manual intervention.

Due to the previous limitations described, the AmdocsResource implementation cannot guarantee an abort on APILink transactions. If the failure that caused the Connection to call an abort is due to other flows than the Amdocs Flow and if the event being processed involved a persistent transaction, the AmdocsResource cannot rollback the transaction. In the exemplary embodiment, the connection model designer is given the facility to treat that event in a different way because this event would be sent to the Error Model.

Also due to the existence of the "Rollback events being processed during machine failure on start-up" property (see 615 in FIG. 6) the user can configure the behaviour of the flow in system failure situations.

7.6 Wizard Files

| File Name | Description |
| --- | --- |
| AmdocsGenConnector.gen | This file enables us to create automatically most of the classes needed for the Amdocs Connector. This file can be generated by using the Connector Wizard utility provided by the Vitria SDK. |
| | You may define using this file the user configurable properties of you flow, the type of flow you wish to create (Source, Target, SourceTarget) and some other important properties. (see com.vitria.connectors.generator.ConnectorWizard utility in Vitria documentation for more information) |
| AmdocsRes.txt | This is your resource file used to define your log messages and text strings used in the implementation classes of your connector. With this file you'll create the local bundle and the messaging API needed to log messages through your connector. (see the section "Using the EMT Framework for Log Messages" in the BusinessWare Connector Programming Guide) |

8. Additional Possible Limitations on the Preferred Embodiment.

8.1 Different Lifecycle Bean Methods

There may be a possibility that the lifecycle methods for creating a remote interface bean object from the home interface bean object do not follow the EJB software object conventions. These conventions indicate that a) the ejbCreate( ) and ejbRemove( ) methods may be renamed, but should have the following signature:

b) Object methodName(void)

If another signature is provided for these methods the Amdocs Connector in the exemplary embodiment doesn't support it.

For changing this implementation to support different signatures the classes AmdocsConnector 1015, EJBEnvironment 1107 and EventToBean 1109 must be changed.

The following steps must be taken to support this feature:

1. To dynamically call these methods, and IDL representation of these methods must be created.
2. The processEvent methods in EventToBean class 1109 must be changed to handle these special methods. The input of the method would not be anymore a Remote Bean Interface but a Home Bean Interface.
3. The calls to the EJBEnvironment methods getRemoteBeanInterfaceOb-j( ) and removeBeanObject ( ) made in AmdocsConnector class 1015 must be removed. Instead, the method getBean( ) that returns the HomeInterface object must be called instead of getRemoteBeanInterfaceObj( ) and care should be taken on the flow to remove the instance of the bean.

8.2 Dynamic Status

At a minimum, any Bean exception thrown due to business logic will have the error message text available in the return Vitria event. All exceptions have this text and it is assumed that Amdocs will use this value in all cases when defining their exceptions. Additionally, the connector looks for specific fields related to severity and "error_type" available on current Amdocs validation exceptions for additional data. However this cannot always be guaranteed.

A different approach could be taken by using a similar approach used in discovering fields and methods on EJB software object data types already done for Vitria event to bean data exchanges. Based on an exception thrown, the connector could try to match members and/or fields via introspection to discover matches and then attempt to pass data. The difference with exceptions are that one "status" object in Vitria would have fields representing all possible fields of exceptions that could be thrown by the beans. In this case, missing fields would not produce additional errors. If fields of the same name exist on different exceptions with different types, the Vitria object could represent a data type that would be "wider" in the JAVA programming language terms than the all but the widest type on the exceptions. For example if two exceptions have a field called X, one as a byte and one as an integer, the Vitria event could hold "integer" and the byte would be casted up in this example. String could be used to hold any type possible basic type on an exception.

This approach could allow one to design the status object component in Vitria IDL to conform to a particular vendor exception list without need of changes to the code to have this connector framework support them.

While the invention has been described in terms of a specific exemplary embodiment, it will be clear to those skilled in the art that such connectors for Enterprise Application Integration (EAI) and business-to-business solutions which use similar object-oriented programming systems can be easily created following the processes described herein, wherein such business solutions can be created in less time and with less risk.

We claim:

1. A computer-implemented method for creating a connector software component, comprising:
   detecting a software object installed on a server;
   determining a plurality of methods supported by the software object;
   determining an order of execution for the plurality of methods, such that invoking the plurality of methods according to the determined order performs a predetermined functionality;
   creating a data structure for storing a list of method identifiers corresponding to the plurality of methods; and
   creating, by a computer, the connector software component configured to:
      utilize a design pattern to allow the connector software component to traverse a hierarchy of objects to determine business logic needed to be executed, wherein the business logic includes an indication of which bean to call, the plurality of methods on the bean to call, and order of method invocation;
      access the data structure to retrieve the list, and
      invoke the plurality of methods in the determined order to perform the predetermined functionality.

2. The method of claim 1, wherein the software object is an Enterprise Java Bean (EJB) software object.

3. The method of claim 1, wherein the data structure is an Interface Definition Language (IDL) definition structure.

4. One or more computer readable media storing computer executable instructions which, when executed on a computer system, performs a method for creating a connector software component, the method comprising:
   detecting a software object installed on a server;
   determining a plurality of methods supported by the software object;
   determining an order of execution for the plurality of methods, such that invoking the plurality of methods according to the determined order performs a predetermined functionality;
   creating a data structure for storing a list of method identifiers corresponding to the plurality of methods; and
   creating the connector software component configured to:
      utilize a design pattern to allow the connector software component to traverse a hierarchy of objects to determine business logic needed to be executed, wherein the business logic includes an indication of which bean to call, the plurality of methods on the bean to call, and order of method invocation;
      access the data structure to retrieve the list, and
      invoke the plurality of methods in the determined order to perform the predetermined functionality.

5. The one or more computer readable media of claim 4, wherein the software object is an Enterprise Java Bean (EJB) software object.

6. The one or more computer readable media of claim 4, wherein the data structure is an Interface Definition Language (IDL) definition structure.

7. A computer-implemented method for executing an event on a server, comprising:
   receiving notification of the event;
   receiving an identifier associated with the server;
   detecting an application program interface (API) installed on the server;
   creating a design pattern to allow a connector software component to traverse a hierarchy of objects to determine business logic needed to be executed, wherein the business logic includes an indication of which bean to call, a plurality of methods on the bean to call, and order of method invocation;
   determining the plurality of methods in said API, each of which is configured to perform an operation on the server related to the event, wherein said determining comprises accessing a data structure to retrieve a list of method identifiers corresponding to the plurality of methods;
   determining an order of execution for said plurality of methods, such that executing the plurality of methods according to the determined order performs same functionality as the event;
   executing, by a computer, said plurality of methods in said determined order; and
   receiving results of each said method executed in said API.

8. The method of claim 7, wherein the API is made available as a plurality of Enterprise Java Bean (EJB) software objects.

9. The method of claim 7, further comprising:
   creating an Interface Definition Language (IDL) definition structure; and
   storing in said IDL definition structure a list corresponding to the plurality of methods.

10. The method of claim 7, further comprising:
    receiving a return value from one of said API methods; and
    based on said return values, determining an additional method in the API for execution.

11. The method of claim 7, further comprising:
    receiving a return value from one of said API methods; and
    based on said return value, generating parameters for a subsequent execution of an API method in said plurality of methods.

12. One or more computer readable media storing computer executable instructions which, when executed on a computer system, performs a method for executing an event on a server, the method comprising:
    receiving notification of the event;
    receiving an identifier associated with the server;
    detecting an application program interface (API) installed on the server;
    creating a design pattern to allow a connector software component to traverse a hierarchy of objects to determine business logic needed to be executed, wherein the business logic includes an indication of which bean to call, a plurality of methods on the bean to call, and order of method invocation;

determining the plurality of methods in said API, each of which is configured to perform an operation on the server related to the event, wherein said determining comprises accessing a data structure to retrieve a list of method identifiers corresponding to the plurality of methods;

determining an order of execution for said plurality of methods, such that executing the plurality of methods according to the determined order performs same functionality as the event;

executing said plurality of methods in said determined order; and receiving results of each said method executed in said API.

13. The one or more computer readable media of claim 12, wherein the API is made available as a set of Enterprise Java Bean (EJB) software objects.

14. The one or more computer readable media of claim 12, the method further comprising:

creating an Interface Definition Language (IDL) definition structure; and storing in said IDL definition structure a list corresponding to the plurality of methods.

15. The one or more computer readable media of claim 12, the method further comprising:

receiving a return value from one of said API methods; and based on said return value, determining an additional method in the API for execution.

16. The one or more computer readable media of claim 12, the method further comprising:

receiving a return value from one of said API methods; and based on said return value, generating parameters for a subsequent execution of an API method in said plurality of methods.

* * * * *

UNITED STATES PATENT AND TRADEMARK OFFICE
CERTIFICATE OF CORRECTION

PATENT NO. : 7,627,853 B2 Page 1 of 1
APPLICATION NO. : 10/278171
DATED : December 1, 2009
INVENTOR(S) : Ibert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1310 days.

Signed and Sealed this

Second Day of November, 2010

David J. Kappos
*Director of the United States Patent and Trademark Office*